United States Patent
Lee

(10) Patent No.: US 9,544,263 B1
(45) Date of Patent: Jan. 10, 2017

(54) METHOD AND SYSTEM FOR SENDING AN INDICATION OF RESPONSE TO AN ONLINE POST FROM A TEXT MESSAGE

(71) Applicant: Bryant Christopher Lee, Bethesda, MD (US)

(72) Inventor: Bryant Christopher Lee, Bethesda, MD (US)

(*) Notice: Subject to any disclaimer, the term of this patent is extended or adjusted under 35 U.S.C. 154(b) by 282 days.

(21) Appl. No.: 14/158,752

(22) Filed: Jan. 17, 2014

Related U.S. Application Data

(60) Provisional application No. 61/757,176, filed on Jan. 27, 2013.

(51) Int. Cl.
*G06F 17/30* (2006.01)
*H04L 12/58* (2006.01)

(52) U.S. Cl.
CPC .................................. *H04L 51/32* (2013.01)

(58) Field of Classification Search
CPC ........... H04L 12/58; H04L 51/32; H04L 51/04
USPC ....................................................... 715/752
See application file for complete search history.

(56) References Cited

U.S. PATENT DOCUMENTS

| | | | |
|---|---|---|---|
| 6,556,835 B1 | 4/2003 | Raivisto | |
| 7,062,536 B2 | 6/2006 | Fellenstein et al. | |
| 7,328,251 B2 | 2/2008 | Ahmed et al. | |
| 8,111,819 B2 | 2/2012 | Zegers | |
| 8,250,155 B2 | 8/2012 | Corry et al. | |
| 8,595,375 B1 | 11/2013 | Kuznetsov | |
| 8,621,019 B2 | 12/2013 | Nguyen et al. | |
| 8,825,759 B1 * | 9/2014 | Jackson | H04L 67/02 705/14.69 |
| 9,253,138 B2 | 2/2016 | Bates et al. | |
| 2002/0099775 A1 | 7/2002 | Gupta | |
| 2005/0039028 A1 | 2/2005 | Eason | |
| 2005/0076090 A1 | 4/2005 | Thuerk | |
| 2006/0259554 A1 | 11/2006 | Willey | |
| 2007/0203911 A1 | 8/2007 | Chiu | |
| 2007/0300169 A1 | 12/2007 | Jones et al. | |
| 2008/0208984 A1 | 8/2008 | Rosenberg et al. | |
| 2010/0088379 A1 | 4/2010 | Borenstein et al. | |
| 2010/0262924 A1 | 10/2010 | Kalu | |
| 2010/0318622 A1 | 12/2010 | Granito et al. | |
| 2011/0087749 A1 * | 4/2011 | Swink | H04L 51/32 709/206 |
| 2011/0113096 A1 | 5/2011 | Long et al. | |

(Continued)

FOREIGN PATENT DOCUMENTS

| | | |
|---|---|---|
| WO | 200159998 | 8/2001 |
| WO | 2008011629 | 1/2008 |
| WO | 2012149506 | 11/2012 |

OTHER PUBLICATIONS

Gmail email program, available at http://gmail.com.

(Continued)

*Primary Examiner* — Nicholas Taylor
*Assistant Examiner* — Sanjoy Roy

(57) ABSTRACT

A computer system may send and/or receive text messages. The text messages may contain an indication of a networked post. The computer system may display one or more interface elements for transmitting an indication of response to a networked post in a text message. Computer representations of an indication of response may be displayed with a networked post.

20 Claims, 18 Drawing Sheets

(56) References Cited

U.S. PATENT DOCUMENTS

| | | | | |
|---|---|---|---|---|
| 2011/0196933 | A1* | 8/2011 | Jackson | G06Q 10/107 709/206 |
| 2012/0011432 | A1 | 1/2012 | Strutton | |
| 2012/0284343 | A1* | 11/2012 | Lee | G06Q 50/01 709/206 |
| 2013/0024780 | A1 | 1/2013 | Sutedja | |
| 2013/0030901 | A1 | 1/2013 | Eichstaedt et al. | |
| 2013/0031183 | A1 | 1/2013 | Kumar et al. | |
| 2013/0055112 | A1 | 2/2013 | Joseph et al. | |
| 2013/0311907 | A1* | 11/2013 | Goldsmith | H04L 51/32 715/758 |
| 2014/0074866 | A1 | 3/2014 | Shah | |
| 2014/0089084 | A1 | 3/2014 | Benyamin et al. | |
| 2014/0129638 | A1 | 5/2014 | Joy | |
| 2014/0136990 | A1* | 5/2014 | Gonnen | H04L 51/18 715/752 |
| 2014/0137010 | A1 | 5/2014 | Matas et al. | |
| 2014/0149891 | A1 | 5/2014 | Moy | |
| 2015/0106429 | A1 | 4/2015 | Hegberg | |
| 2015/0135244 | A1 | 5/2015 | Hilson | |
| 2015/0142899 | A1 | 5/2015 | Birney et al. | |
| 2015/0339735 | A1 | 11/2015 | Badros et al. | |
| 2015/0356468 | A1 | 12/2015 | Cummins | |
| 2016/0063127 | A1 | 3/2016 | Naveh | |
| 2016/0086369 | A1 | 3/2016 | Matas et al. | |

OTHER PUBLICATIONS

WhatsApp computer application, available at http://www.whatsapp.com, Apple App Store, and Google Play.

SnapChat computer application, available at http://www.snapchat.com, Apple App Store, and Google Play.

WeChat computer application, available at http://www.wechat.com/en/, Apple App Store, and Google Play.

Vine computer application, available at https:llvine.co, Apple App Store, and Google Play.

Instagram computer application, available at http://instagram.com, Apple App Store, and Google Play.

U.S. Appl. No. 14/140,798, filed Dec. 26, 2013, "Method and System for Sending or Receiving an Indication of Reply to an Electronic Message" by Lee.

Non-final Office Action of Oct. 30, 2015 for U.S. Appl. No. 14/140,798 filed by Lee.

Brough Turner and Marc Orange, NMS Communications, 3G Tutorial, http://www.nmscommunications.com/file/3G_Tutorial.pdf (2002).

Radio-Electronics.com, Cellular Telecommunications and Cell Phone Technology, http://www.radio-electronics.com/info/cellulartelecomms/cellular_concepts/cellular-network-basics.php (accessed Dec. 2, 2012).

GSM Network Architecture, http://gsmfordummies.com/architecture/arch.shtml (accessed Dec. 2, 2012).

Cell Phone Towers, http://www.visiognomy.com/diagrams/archives/2005/02/16/cell-phone-towers/ (2005) (accessed Dec. 2, 2012).

Cellular Base Stations, http://www.ieeeghn.org/wiki/index.php/Cellular_Base_Stations (accessed Dec. 2, 2012).

MMS Interworking, http://www.globalspec.com/reference/77595/203279/chapter-9-mms-interworking (accessed Dec. 2, 2012).

Howard Forums Thread, Problem with my 8830 World Edition Roaming in UK, http://www.howardforums.com/showthread.php/1584175-Problem-with-my-8830-world-edition-roaming-in-UK (accessed Dec. 2, 2012).

Celtnet Mobile Phones, Mobile Phones: How They Work http://www.celtnet.org.uk/mobile-phone/how-mobiles-work-3.php (accessed Dec. 2, 2012).

Saad Chdhry, How Mobile to Mobile SMS and Web to SMS Works, http://propakistani.pk/2009/07/30/how-mobile-to-mobile-sms-and-web-to-sms-works/ (accessed Dec. 2, 2012).

How SMS are sent from Internet / Websites to Mobile Phones, http://www.engineersgarage.com/mygarage/how-websites-send-sms-to-mobile-phones (accessed Dec. 2, 2012).

Outlook Blog, Managing Automatic Meeting Responses, http://blogs.office.com/b/microsoft-outlook/archive/2008/02/14/managing-automatic-meeting-responses.aspx (accesed Dec. 3, 2012).

Microsoft, Outlook Meeting Requests: Essential Do's and Don'ts, http://office.microsoft.com/en-us/outlook-help/outlook-meeting-requests-essential-dos-and-donts-HA001127678.aspx (accessed Dec. 3, 2012).

Illinois State University Technology Support Center, Tracking Attendee Meeting Responses in Outlook 2007, 2010, and Outlook Web App (OWA), https://helpdesk.illinoisstate.edu/kb/1280/Tracking_attendee_meeting_responses_in_Outlook_2007_2010_and_Outlook_Web_App_OWA/ (accessed Dec. 3, 2012).

University College London, How to Use the Outlook Calendar, http://www.ucl.ac.uk/isd/staff/ads/help/guides/outlook/useoutlookcalendar (accessed Dec. 3, 2012).

Microsoft Outlook computer program, including Outlook 2003, Outlook 2007, Outlook 2010.

TechCrunch, Facebook Activates 'Like' Button; FriendFeed Tires of Sincere Flattery (Feb. 9, 2009).

Facebook.com website (accessed Dec. 26, 2013).

GroupMe computer program, available at http://www.groupme.com, Apple App Store, and Google Play.

GroupMe, Group SMS on GroupMe, https://groupme.com/sms (accessed Dec. 31, 2012).

GroupMe, What is GroupMe?, http://help.groupme.com/entries/514793-what-is-groupme (Mar. 31, 2011) (accessed Jan. 1, 2013).

GroupMe Blog, http://blog.groupme.com/tagged/announcements (accessed Apr. 14, 2013).

GroupMe website, http://GroupMe.com (accessed Dec. 31, 2012).

University of Manchester, Using Microsoft Outlook 2003 (unknown year) (accessed Dec. 26, 2013).

Powerinbox computer program, available at http://powerinbox.com/.

Mohammed T. Ansari, The Internet and Wireless Messaging, http://www.clearbrain.com/sms.htm (accessed Dec. 2, 2012).

Microsoft Outlook 2010: Using the Voting Options, http://www.google.com/url?sa=t&rct=j&q=&esrc=s&source=web&cd=3&ved=0CDYQFjAC&url=http%3A%2F%2Flis.dickinson.edu%2Ftechnology%2Ftraining%2Ftutorials%2F2010%2Foutlook%2Fvote.pdf&ei=6KO8UtezEKrt2wW5nYHABA&usg=AFQjCNEb_d3JdSPnwhE4ZTiM-qfsw1HSw&bvm=bv.58187178,d.b2l (accessed Dec. 3, 2012).

Donna K. Jones, Using Voting Buttons in Outlook 2012, http://ittrainingtips.iu.edu/outlook/using-voting-buttons-in-outlook-2010/06/2011 (Jun. 22, 2011).

Outlook Blog, Living in Outlook: Voting Buttons, http://blogs.office.com/b/microsoft-outlook/archive/2009/06/12/living-in-outlook-voting-buttons.aspx (accessed Dec. 3, 2012).

Fujitsu, Understanding Mobile Wireless Backhaul, http://www.google.com/url?sa=t&rct=j&q=&esrc=s&source=web&cd=1&ved=0CDkQFjAA&url=http%3A%2F%2Fwww.fujitsu.com%2Fdownloads%2FTEL%2Ffnc%2Fwhitepapers%2FFujitsu_Wireless_Backhaul.pdf&ei=m6S8Uu7_E6Wi2QWXolDgBA&usg=AFQjCN EIQcffbZ5ogAD9LVH1fqJ3pei4zw&bvm=bv.58187178,d.b2I (unknown year) (accessed Jan. 5, 2013).

AdaptiveMobile.com, Network Protection Solutions, http://www.adaptivemobile.com/product-portfolio/networkprotection (accessed Dec. 2, 2012).

Powerinbox Facebook PowerApp, http://powerinbox.com/apps/facebookapp (accessed Dec. 31, 2012).

UMA Technology, UMA Overview, http://www.umatechnology.org/overview/ (accessed Dec. 2, 2012).

Likeable Daily, How to: Like a Facebook Page Via Text Message (Nov. 19, 2012) (accessed Jan. 1, 2013).

Facebook.com, How do I like a Page via Mobile Text?, http://www.facebook.com/help/170960386370271/ (accessed Jan. 1, 2013).

Sachin Shetty, Security in SMS Banking, http://palizine.plynt.com/issues/2005Nov/secure-sms-banking/ (Nov. 2005).

Final Office Action of Apr. 5, 2016 in U.S. Appl. No. 14/140,798 filed by Lee.

* cited by examiner

METHOD AND SYSTEM FOR SENDING AN INDICATION OF RESPONSE TO AN ONLINE POST FROM A TEXT MESSAGE

CROSS-REFERENCE TO RELATED APPLICATIONS

This application claims the benefit of U.S. provisional patent application Ser. No. 61/757,176 "Method and System for Sending an Indication of Response to an Online Post from a Text Message" filed Jan. 27, 2013, which is hereby incorporated by reference in its entirety.

FIELD OF THE INVENTION

The present invention relates generally to networks, the Internet, and the World Wide Web, and more particularly, to methods and apparatuses for sending an indication of response to a post on a network.

BACKGROUND

Cellular phones and other mobile devices may allow users to make calls, access the Internet, or perform other information communications tasks. Some mobile devices are configured to send and receive text messages. Text messages may contain text and sometimes multimedia data or dynamic content. Text messages may be sent by various technologies including SMS, MMS, and the Internet.

The Internet is a system of interconnected computer networks, which allows computer systems on the Internet to communicate with each other. Computers may communicate according to certain services such as electronic mail and the World Wide Web (WWW or "the web"). The WWW service is a system of interlinked hypertext documents. Documents on the web can be viewed with web browsers or other web-enabled applications. Web pages, text, images, videos, and other multimedia are all types of media that can be accessed in a web browser. To view a document on the web, a client computer would usually send a request to a web server that is hosting web content. The client computer may identify the requested resource using an identifier such as a Uniform Resource Locator (URL). The web server would respond to the request by sending the appropriate document to the client computer. The client computer can display the document in a web browser. Web pages can be specified in many formats and languages. Sometimes, the web pages may include scripts, which are executable code. Web pages may also be backed by a database. Access to a web page may cause code to be executed on the web server and may cause accesses to a database. Web applications may also be Rich Internet Applications (RIAs) that operate on a software platform such as Flash or Silverlight. An RIA may require installation of the software platform on the client computer, for example by browser plug-in, in order to function.

In some cases a text message may relate to or mention a post that is on the Internet or other network. It may be desirable to allow a user who has received a text message identifying an online post to be able to post some kind of response to the online post, for example an indication of liking the post or disliking the post or, perhaps, a comment to the online post. It may be desirable to allow the user to do this from the text messaging program itself, and in some cases via user interface elements that may be located on or displayed associated with the text message that identifies the online post.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some embodiments of the invention relate to receiving a text message containing an indication of an online post and displaying a user interface element associated with that text message that allows the user to send an indication of response to the online post. The indication of response to the online post might be non-textual, such as an indication of liking or not liking post, or in other cases may include text, such as a user-entered comment.

Some embodiments relate to sending a text message containing an indication of an online post to cause the text message to be displayed on the recipient device with a user interface element that allows the user to send an indication of response to the online post.

Some embodiments relate to transmitting an electronic request to send a text message containing an indication of an online post to cause the text message to be displayed on the recipient device with a user interface element that allows the user to send an indication of response to the online post.

Some embodiments relate to methods of displaying text messages with user interface elements that allow the sending of an indication of response to an online post.

Some embodiments relate to displaying text messages having dynamic content.

Some embodiments relate to displaying online posts with indications of response received from mobile devices.

Additional features and advantages of the invention will be set forth in the description which follows, and in part will be implicit from the description, or may be learned by the practice of the invention. The features and advantages of the invention may be realized and obtained by means of the instruments and combinations particularly pointed out in patent claims. These and other features of the present invention will become more fully apparent from the following description and any patent claims, or may be learned by the practice of the invention as set forth hereinafter.

DETAILED DESCRIPTION

Figure 1A:
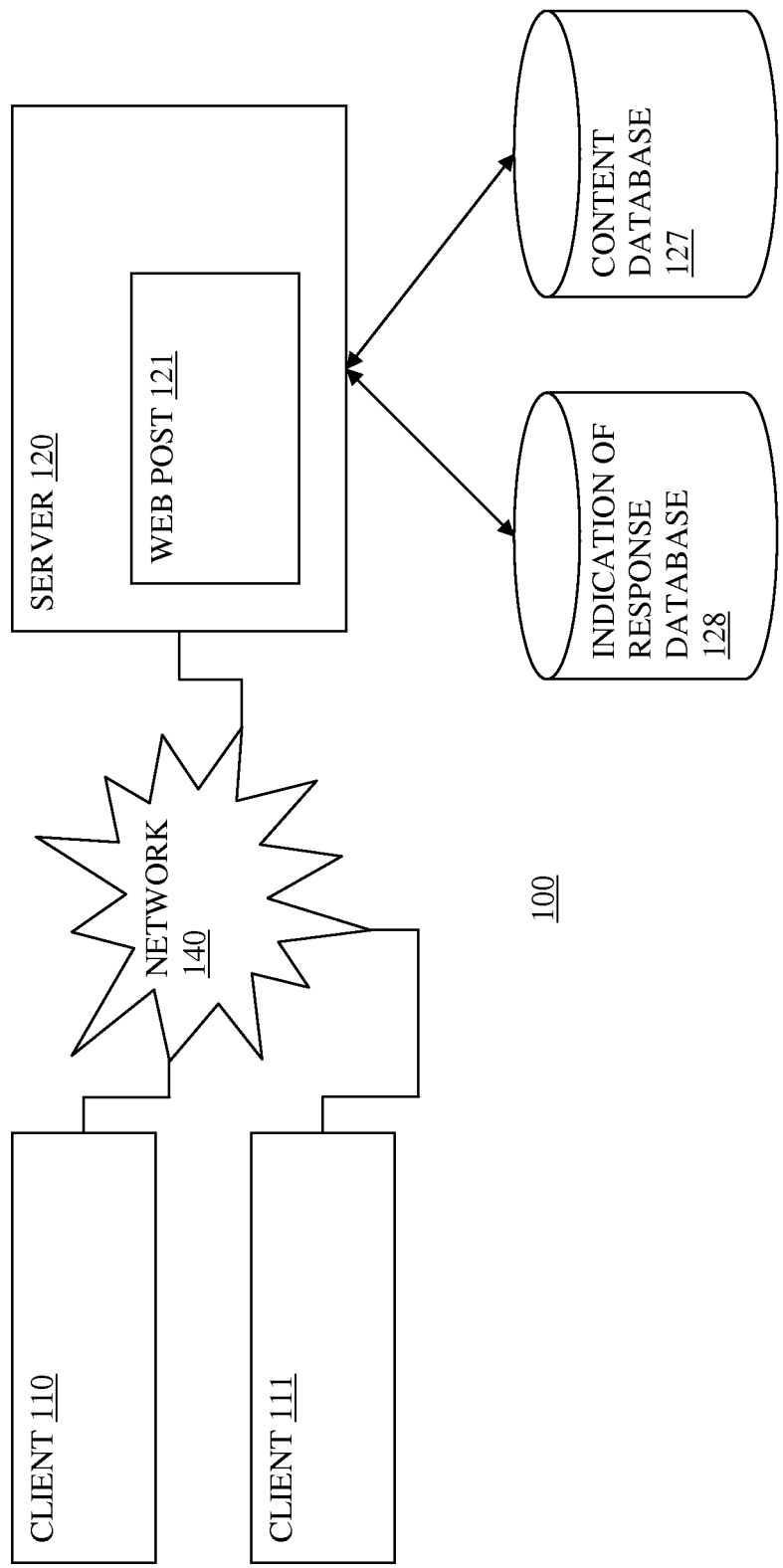
FIG. 1A is a diagram illustrating an exemplary network environment in which one embodiment may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention. In addition, it should be understood that steps of a method can be performed in different orders than the order presented in this specification.

Embodiments of the invention may comprise one or more computers. Embodiments of the invention may comprise software and/or hardware. Some embodiments of the invention may be software only and may reside on hardware. A computer may be special-purpose or general purpose. A computer or computer system is defined to include without limitation personal computers, desktop computers, laptop computers, mobile devices, cellular phones, smart phones, PDAs, pagers, multi-processor-based devices, microprocessor-based devices, programmable consumer electronics, cloud computers, tablets, minicomputers, mainframe computers, server computers, microcontroller-based devices, devices performing computations on a processor or CPU, and the like. A computer or computer system is further defined to include distributed systems, which are systems of multiple computers (of any of the aforementioned kinds) that interact with each other, possibly over a network, to achieve a goal (a goal includes performance of a method). Thus, embodiments of the invention may be practiced in distributed environments involving local and remote computer systems. In a distributed system, aspects of the invention may reside on multiple computer systems.

Embodiments of the invention may comprise computer-readable media having computer-executable instructions or data stored thereon. A computer-readable media is physical media that can be accessed by a computer. It may be non-transitory. Examples of computer-readable media include, but are not limited to, RAM, ROM, hard disks, flash memory, DVDs, CDs, magnetic tape, and floppy disks.

Computer-executable instructions comprise, for example, instructions which cause a computer to perform a function or group of functions. Some instructions may include data. Computer executable instructions may be binaries, object code, intermediate format instructions such as assembly language, source code, byte code, scripts, and the like. A computer program is software that comprises multiple computer executable instructions.

A database is a structured set of data. It refers to databases, networks of databases, and other kinds of file storage. No particular kind of database must be used. The term database encompasses many kinds of databases such as hierarchical databases, relational databases, post-relational databases, graph databases, and any other kind of database or structured data.

A network comprises one or more data links that enable the transport of electronic data. Networks can connect computer systems. The term network includes local area network (LAN), wide area network (WAN), telephone networks, wireless networks, intranets, the Internet, and combinations of networks.

In this patent, the term transmit includes indirect as well as direct transmission. A computer X may transmit a message to computer Y through a network pathway including computer Z. Similarly, the term send includes indirect as well as direct sending. A computer X may send a message to computer Y through a network pathway including computer Z. Furthermore, the term receive includes receiving indirectly (e.g., through another party) as well as directly. A computer X may receive a message from computer Y through a network pathway including computer Z.

Similarly, the terms "connected to" and "coupled to" include indirect connection and indirect coupling in addition to direct connection and direct coupling. These terms include connection or coupling through a network pathway where the network pathway includes multiple elements.

In this patent, "computer program" means one or more computer programs. A person having ordinary skill in the art would recognize that single programs could be rewritten as multiple computer programs. Also, in this patent, "computer programs" should be interpreted to also include a single computer program. A person having ordinary skill in the art would recognize that multiple computer programs could be rewritten as a single computer program.

The term computer includes one or more computers. The term computer system includes one or more computer systems. The term computer server includes one or more computer servers. The term computer-readable medium includes one or more computer-readable media. The term database includes one or more databases.

I. Exemplary Network Environments

FIG. 1A is a block diagram illustrating an exemplary network environment where some embodiments may operate. The network environment 100 may include multiple clients 110, 111 and one or more servers, such as server 120.

Network 140 may be, for example, the Internet. Network 140 could also be a local area network (LAN), a wide area network (WAN), a telephone network, such as the Public Switched Telephone Network (PSTN), an intranet, or a combination of networks. Two clients 110, 111 and one server 120 have been illustrated for simplicity, though in practice there may be more or fewer clients and servers. In some embodiments, the clients 110 and 111 may communicate with each other as well as the server 120. Also, the server 120 may communicate with other servers.

Clients 110, 111 may be computers (see definition of "computer" above). Servers 120, 121 may be computers, such as server computers. They may be configured to handle requests from clients. Server 120 may be implemented as a number of networked server devices, though it is illustrated as a single entity.

In the illustrated embodiment 100, the server 120 is connected to an indication of response database 128, for storing indications of response, and a content database 127, for storing content. The server 120 is hosting a web post 121. In practice, a web post may be static content, such as a pre-defined HTML document, or dynamic content. Dynamic content can be generated on the fly as the user requests it. For example, the server 120 may generate the web post 121 by accessing the content database 127 to retrieve content and formatting the content according to defined styles. The server 120 may also display with the formatted content a count of the number of indications of response retrieved from the indication of response database 128. The clients 110, 111 may view the web post 121 upon request to the server 120.

The term "web post" refers generally to web content. A web post may be a web page or a sub-element of a web page. The term "web page" refers broadly to a document displayed over the Internet and accessible from the World Wide Web. Web page refers to more than just HTML pages and includes documents viewable through Rich Internet Applications such as Adobe Flash, JavaFX, and Microsoft Silverlight as well as multimedia documents accessible from the Web such as word processing documents, presentations, images, videos, PDFs, and so forth.

Thus, a "web post" may be a sub-component of a web page such as a blog post displayed on a blog, or a post on a user's wall on Facebook. Examples of web posts include Facebook pages, Facebook wall posts, blog posts, microblog posts (such as Tweets on Twitter), web pages, pages on a social network, posts and/or wall posts on a social network, comments on another web post, result items returned from a search engine, products listed on a shopping site, news articles, posted videos, posted images, posted multimedia, and so forth.

The term "networked post" may be used to describe posts on a network, but not necessarily on the web. For example, the term "networked post" would cover posts on a private network that is not accessible via the World Wide Web. ("Networked post" also includes web posts.)

Some posts may be on the web but not accessible until the user has logged into a private network or virtual network. For instance, users might not be able to view a web post until they have logged into a website.

Figure 1B:
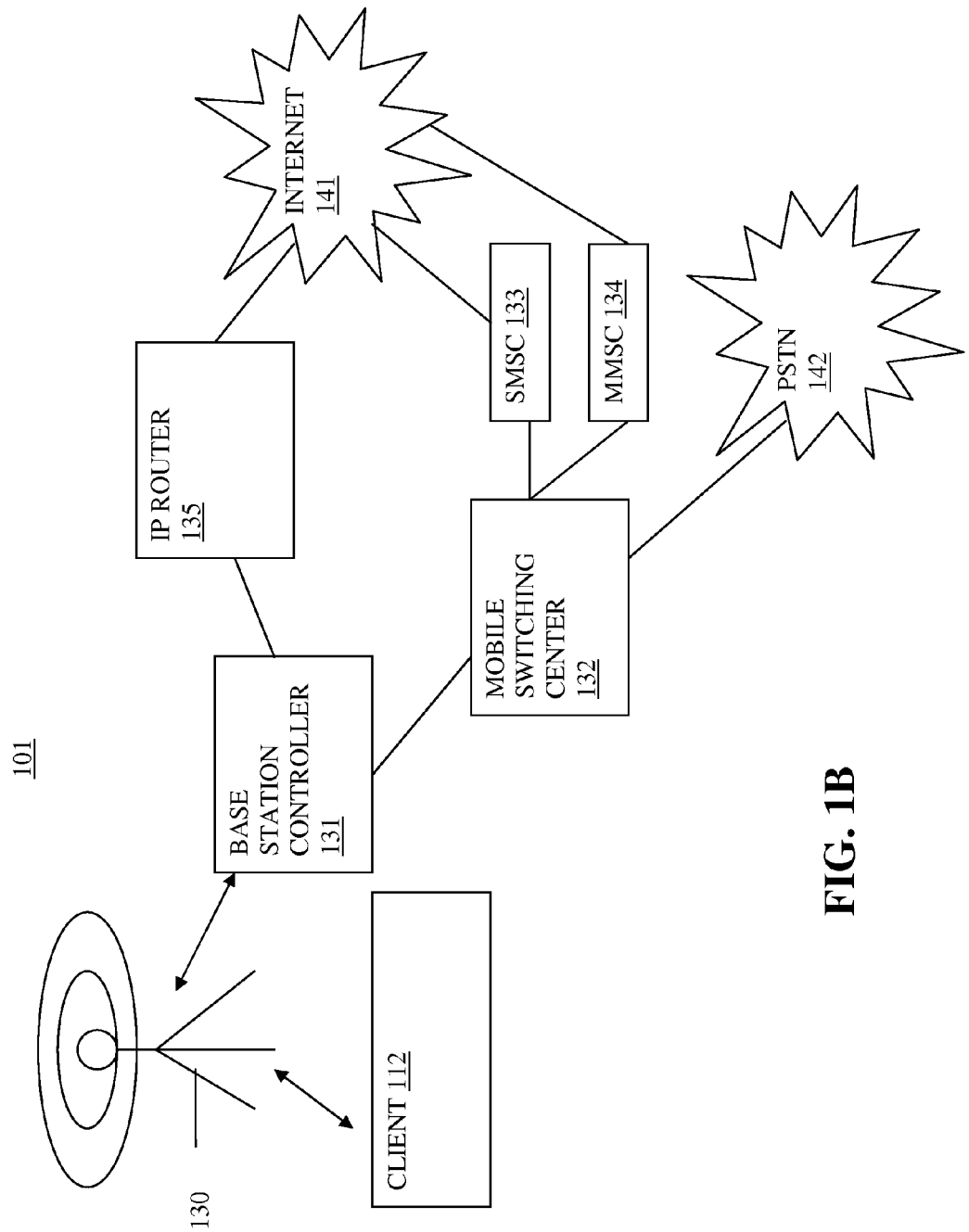
FIG. 1B is a diagram illustrating an exemplary mobile network that may be used in some embodiments.

FIG. 1B illustrates an exemplary mobile network 101 where some embodiments may operate. A mobile network is, for instance, a network that connects mobile devices. Mobile devices may be, for instance, a mobile phone, smart phone, personal data assistant, tablet, laptop, or other device configured to access a mobile network. The mobile network may be a network operated by a mobile carrier and may include facilities needed to provide Mobile Telecommunications Services. A mobile network may facilitate the connection of a client to other networks such as the Internet or Public Switched Telephone Network (PSTN). The technology in mobile networks is constantly changing, and it should be understood that the mobile network architecture 101 is only exemplary. It is contemplated that embodiments of the invention may be used in other kinds of mobile networks.

A client 112 is shown. The client 112 may connect wirelessly to a base transceiver station (BTS) 130. Mobile communications may be accomplished by a wide variety of protocols, including but not limited to 2G, 3G, 3.5G, 4G, CDMA, FDMA, OFDMA, and TDMA as well as others. The BTS may comprise a cellular tower, which is a tower holding antenna arrays for communicating with mobile devices. In other cases, the BTS may comprise a building that has antenna arrays mounted on it for communicating with mobile devices.

The BTS may be connected to a base station controller (BSC) 131, which in fact may serve several BTSs. The BSC may perform functions such as handover, cell configuration data, and control of radio frequency (RF) power levels in the BTSs. It may provide control functions and physical links between the mobile switching center (MSC) 132 and the BTSs. The BSC may be connected to an MSC 132, which in fact may serve several BSCs. The MSC 132 may handle functions such as call routing, call setup, and basic switching functions. It may also connect to other MSCs. The MSC 132 may connect to the Public Switched Telephone Network (PSTN) 142, for instance via a Gateway Mobile Switching Center (GMSC). Thus, phone calls from client 112 may be made to and from phones on the PSTN 142.

The MSC 132 may also be connected to a Short Message Service Center (SMSC) 133 and Multimedia Message Service Center (MMSC) 134. The SMSC 133 handles the Short Message Service (SMS) operations of a mobile network. It may forward an SMS message from the client 112 to the appropriate destination. For example, the SMSC 133 would typically be connected to SMSCs in other carrier's networks, so that the client 112 could send and receive SMS messages to and from users in other mobile networks. Meanwhile, the MMSC 134 handles the Multimedia Messaging Service (MMS) operations of a mobile network. It may forward an MMS message from the mobile client 112 to the appropriate destination. For example, the MMSC 133 would typically be connected to MMSCs in other carrier's networks, so that the client 112 could send and receive MMS messages to and from users in other mobile networks. The SMSC 133 and MMSC 134 may be connected to the Internet to allow SMS and MMS text messages to be sent, received, and/or viewed from computers on the Internet. The SMSC 133 is typically connected to the Internet via SMS gateways. One could set up an SMS gateway using open source software such as Kannel. There are also many providers of SMS gateways such as Clickatell. Similarly, the MMSC 134 is typically connected to the Internet via MMS gateways. Use of an MMS gateway can be obtained from various providers such as OpenMarket. An open source MMS gateway called Mbuni is available on SourceForge.

An IP router 135 may be connected to the base station controller 131. The IP router may be connected to the Internet 141. Thus, the client 112 may send and receive data from the Internet. This is enabled on many mobile devices via a data plan. The Internet 141 is one possible implementation of the network 140.

It should also be understood that client 112 may be able to connect to the Internet 141 via other mechanisms, in addition to use of a mobile network. For instance, the client 112 may use Wi-Fi to connect to the Internet via a wireless network access point (hotspot). Wi-Fi is a technology allowing wireless communication. The IEEE 802.11 protocol defines one possible implementation of Wi-Fi. A hotspot may offer a fast Internet connection such as cable Internet, DSL, or T1.

Text messages are implemented in some mobile networks. A text message is typically either sent or received from a mobile device, and sometimes both. SMS messages and MMS messages are examples of text messages. However, text messages can also be sent and received entirely over the Internet, such as via a cellular data plan or via Wi-Fi, and without involving an SMSC or MMSC. For instance, the iMessage format is sent and received over the Internet. Text messages operating over TCP/IP can be referred to as TCP/IP text messages. Text messages operating over UDP can be referred to as UDP text messages.

However, text messages are distinct from email. Email is a system of worldwide communication that operates via protocols such as SMTP, X.400, POP3, and IMAP. Email requires an email account, from which emails may be sent or received.

Text messages may contain text and in addition may sometimes contain data. For example, SMS messages may contain binary data. MMS messages may include data and multimedia such as images and videos. Text messages sent over the Internet (e.g., TCP/IP or UDP) could be configured to contain arbitrary data, depending on the format.

Figure 1C:
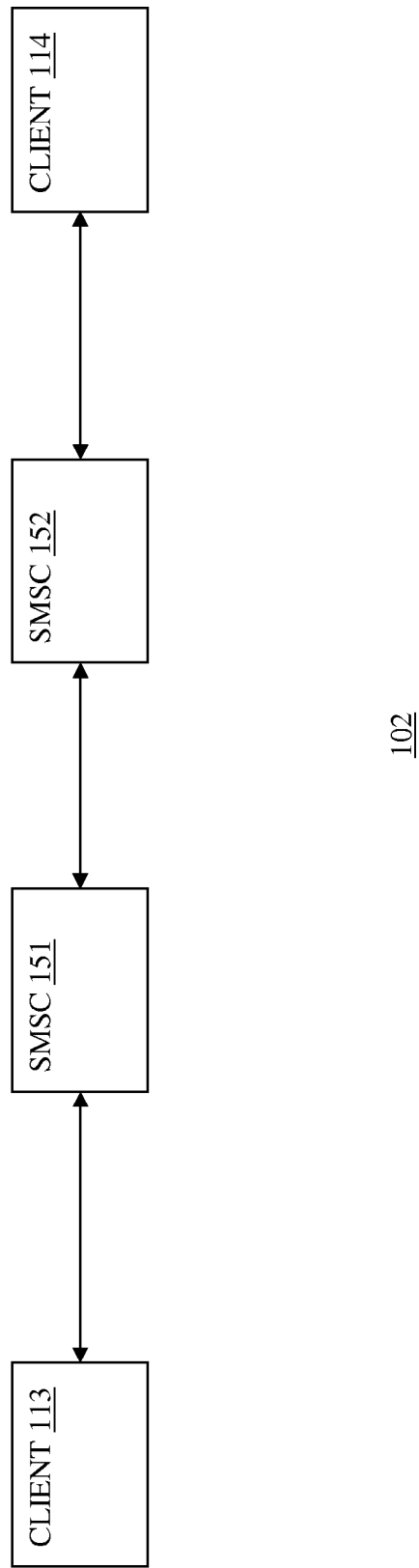
FIG. 1C is a diagram illustrating an exemplary mechanism for sending and receiving text messages by SMS.

FIG. 1C illustrates an exemplary mechanism 102 by which two clients may transmit and receive text messages over SMS. The client 113 may send a text message to its carrier's SMSC 151. The SMSC 151 may send the text message to the recipient's carrier's SMSC 152, for example by using SS7 signaling protocols. The SMSC 152 may then transmit the text message to the recipient 114. The client 114 may send text messages to client 113 by following the reverse mechanism. Note that the sending of MMS messages can be performed in an analogous way by using the MMSCs of each carrier rather than SMSCs.

Figure 1D:
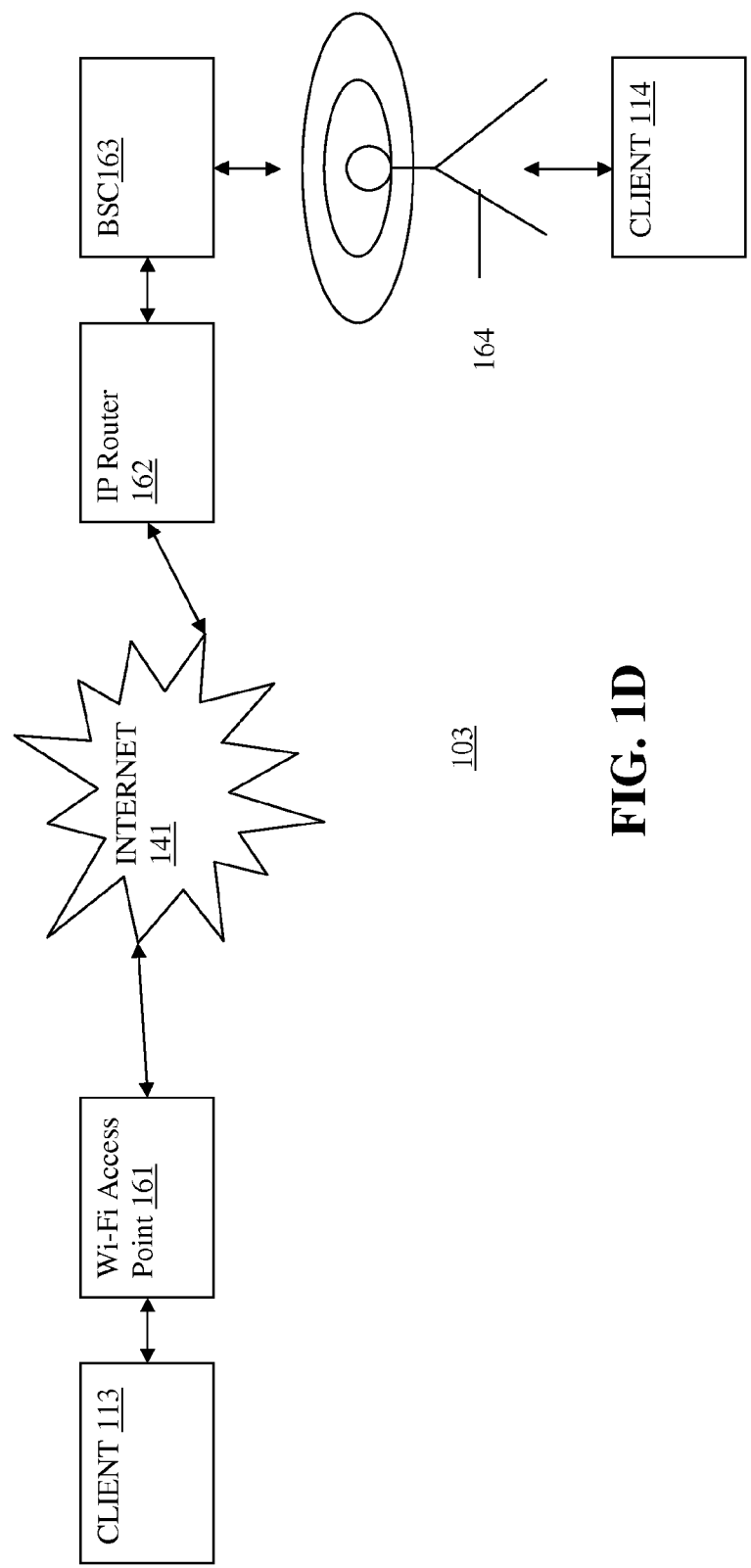
FIG. 1D is a diagram illustrating an exemplary mechanism for sending and receiving text messages over the Internet.

FIG. 1D illustrates an exemplary mechanism 103 by which two clients may transmit and receive text messages over TCP/IP or the Internet. The client 113 is connected to a Wi-Fi Access Point 161, which provides the client 113 with access to the Internet 141. The client 114 is connected via a BTS 164 to a BSC 163 to an IP Router 162 that is connected to the Internet 141. Thus, client 113 may send a text message via the Internet to client 114. Likewise, client 114 may send a text message via the Internet to client 113.

Analogously, two clients could communicate via text messages when both the clients are connected to the Internet over Wi-Fi or when both the clients are connected to the Internet via a BTS/BSC/IP Router. Clients can connect to the Internet in many ways, and it is contemplated that text messages would usually be able to be sent between Internet-connected clients no matter the form their Internet connection takes.

Figure 1E:
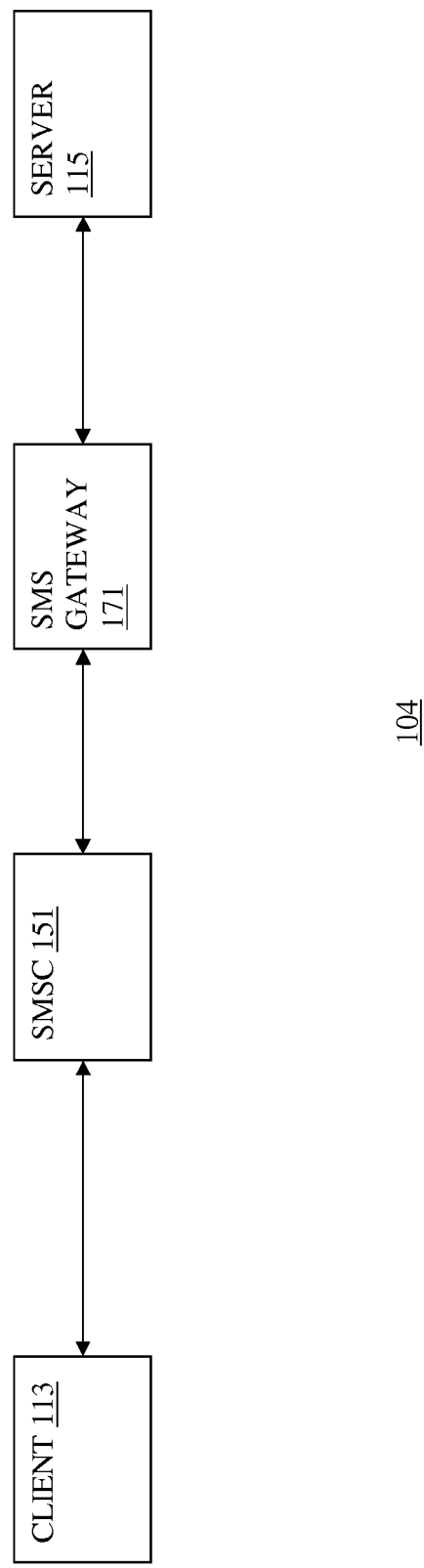
FIG. 1E is a diagram illustrating an exemplary mechanism for sending and receiving text messages via SMS and/or SMS gateways.

FIG. 1E illustrates an exemplary mechanism 104 by which a server 115 may send a text message to a client 113. The server transmits a request to SMS Gateway 171 to send a text message to the user at client 113. The request may be a web services request such as using Simple Object Access Protocol (SOAP). It could also be a request over the File Transfer Protocol (FTP) or Short Message Peer-to-Peer (SMPP) protocol, for example. The SMS Gateway 171 may then send a text message to the SMSC 151, for example using the SMPP protocol. The SMSC 151 may then send the text message to the client 113.

SMS gateways have already been discussed. One could run their own SMS gateway by using the Kannel free software. Also, there are various providers of SMS gateways such as Clickatell, mBlox, OpenMarket, and SAP SMS 365. A provider of an SMS gateway may be referred to as an SMS aggregator.

MMS text messages can be sent from a server to a client in a similar manner. One would transmit a request to send a text message to an MMS gateway and the MMS gateway would send a text message to the recipient carrier's MMSC to be sent to the recipient. An MMS gateway can be set up using the Mbuni open source software. Providers of MMS gateways include OpenMarket, mBlox, and SAP MMX 365. A provider of an MMS gateway may be referred to as an MMS aggregator.

In some cases, the client 113 may send a text message through the SMSC 151 and SMS Gateway 171 to the server 151. For example, the SMS Gateway 171 may deliver the text message to the server 151 as an email or other electronic document. SMS gateways can translate text messages into emails and vice versa. MMS gateways can do the same for MMS messages.

Figure 1F:
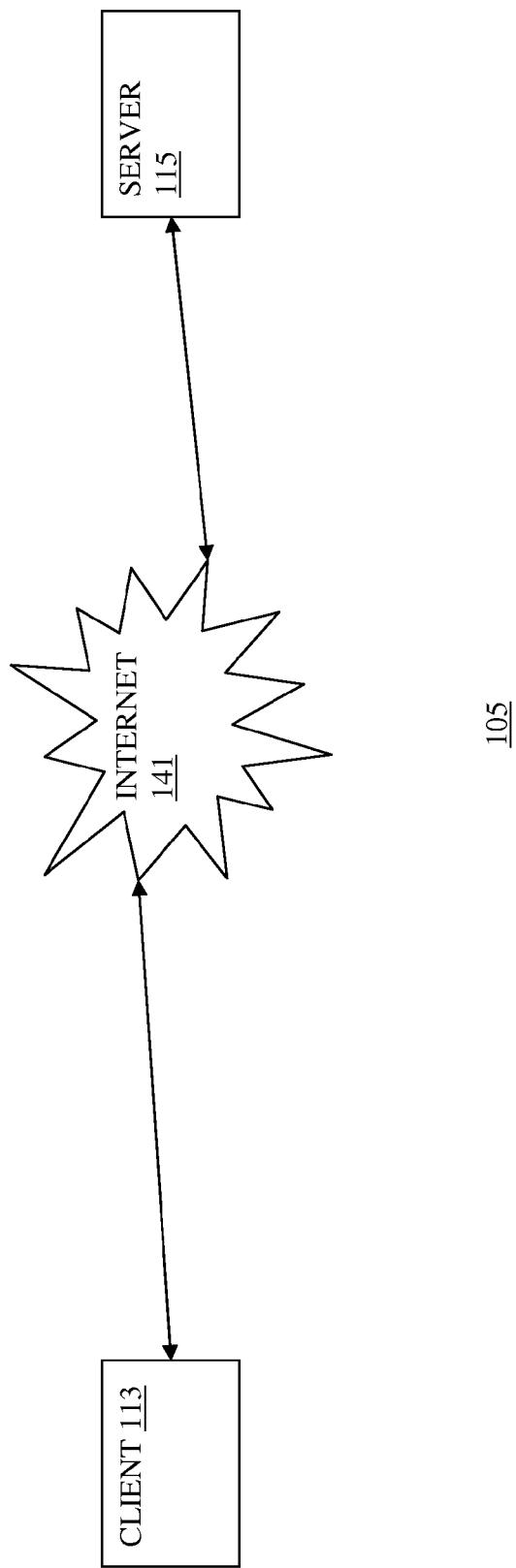
FIG. 1F is a diagram illustrating an exemplary mechanism for sending and receiving text messages over the Internet.

FIG. 1F illustrates an exemplary mechanism 105 by which a server 115 may send a text message to a client 113. In this case, the text message is transmitted over the Internet, such as by TCP/IP. The server 115 is connected to the Internet, for example via a fiber optic cable. The various mechanisms by which a client 113 may be connected to the Internet have already been discussed. Therefore, a server 115 may send a text message to the client 113 through use of an Internet connection. Similarly, the client 113 could send a text message to the server 115.

II. Exemplary Methods

Some embodiments of the invention relate to either sending or receiving a text message where the text message is associated with a web post and allowing the user to perform an action to send an indication of response to the web post.

Figure 2A:
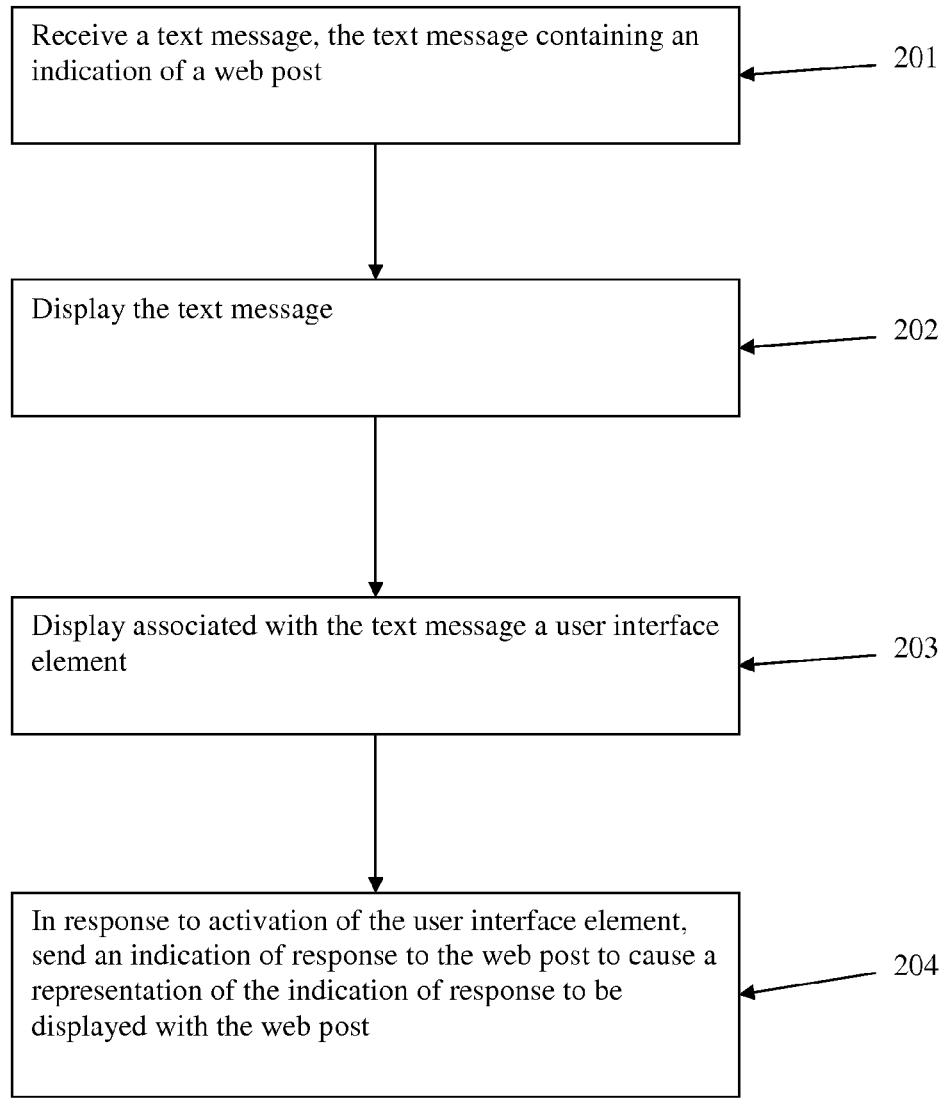
FIG. 2A is a flow chart illustrating an exemplary method for receiving a text message containing an indication of a web post and allowing the user to send an indication of response to the web post.

FIG. 2A illustrates an exemplary method 200 that can be performed in some embodiments of the invention. Embodiments may be used to send an indication of response to a web post. The method may be performed by a computer system.

An indication of response is an indication of a user's response to a post. For example, an indication of response may be liking the post (as in "likes" on Facebook), disliking the post, indicating support for the post, indicating opposition to the post, indicating favoring the post, indicating disfavoring the post, voting up a post (for example, the voting mechanisms of Digg.com or Reddit.com), voting down a post, and so forth. In some cases, a user may submit an indication of response without the use of text entry—for example, he may submit the indication of response by pressing a button. An indication of response submitted without the use of text entry can be called a "non-textual indication of response." A non-textual indication of response may still be displayed with text: for example, the user may press a button to "like" an item thereby causing the word "like" to appear next to a web post.

In other cases, submission of an indication of response can involve text entry. For example, an indication of response may be a user-entered comment. Such a comment may be entered, for example, by text entry or by voice recognition software (speech to text technology can be obtained from providers such as www.ispeech.org and can also be obtained from open source voice recognition software such as Simon, http://simon-listens.blogspot.com/; CMU Sphinx, http://cmusphinx.sourceforge.net/; Zanzibar OpenIVR, http://www.spokentech.org/index.html; Julius, http://julius.sourceforge.jp/en_index.php?q=en/index.html; and RWTH ASR, http://www-i6.informatik.rwth-aachen.de/rwth-asr/). A user-entered comment may be displayed with a web post.

Thus, exemplary method 200 may involve receiving a text message, where the text message contains an indication of a web post (Act 201). For instance, the web post may be web post 121 hosted by server 120. An indication of a web post is something to identify it, such as a URL, name, or other identifier. It may be unique but does not have to be. The indication of a web post may be displayed to the user but does not have to be. For example, a URL such as www.umd.edu may be embedded in the text message but be accompanied by a tag specifying that the text "University of Maryland" should be displayed instead of the URL. The text message can contain additional text besides the indication of the web post. For example, the text message might indicate to the recipient an advertisement or offer. In some cases, this may be a consumer offer, in other words a deal offered to a consumer, such as "buy one get one free" or "cupcakes only $0.50 for today only." On the other hand, the text message may be from a friend identifying a service that the recipient may find useful.

The text message may be sent or received according to any of the methods of sending or receiving text messages previously detailed in this patent. For instance, exemplary methods of sending and receiving text messages have been detailed at least with respect to mechanisms 102, 103, 104, and 105. The text message does not have to have been sent by server 120 that hosts web posts, rather it could have been sent by another client or by a different server such as server 115. For example, a user might text his friend with a link saying "you should like this (www.umd.edu)" or a large organization might send a text to many users via an SMS or MMS aggregator such as "if you're an alumnus, you should like your alma mater (www.umd.edu)."

The text message may be displayed (Act 202). A user interface element may be displayed associated with the text message (Act 203). This user interface element may be a visible element such as a button. It can also be a text field in embodiments accepting user comments. In response to activation of the user interface element, the system may send an indication of response to the web post to cause a representation of the indication of response to be displayed with the web post (Act 204). For example, the indication of response may be logged in the indication of response database 128. When the web post 121 is viewed by some user, the server 120 may present a representation of the indications of response associated with the web post 121. For example, a representation of the indication of response may be a count of the number of indications of response received. This represents the indication of response because receipt of the indication of response causes the count to change (increment). Other possible representations of an indication of response could be text, graphics, multimedia, or stylistic changes (such as highlighting the post or changing its colors).

It should be understood that activation of a user interface element can occur by various means and is not limited to activation of a button. Activation includes clicks, taps, performance of a gesture, or utterance of a voice command, as well as other possible actions.

A method analogous to exemplary method 200 may be used in the context of networked posts that are not necessarily on the web by replacing each above use of the term "web post" with the term "networked post." An indication of a networked post may also be a URL, but the URL could be local to a certain network and might not be a URL for the World Wide Web.

Figure 2B:
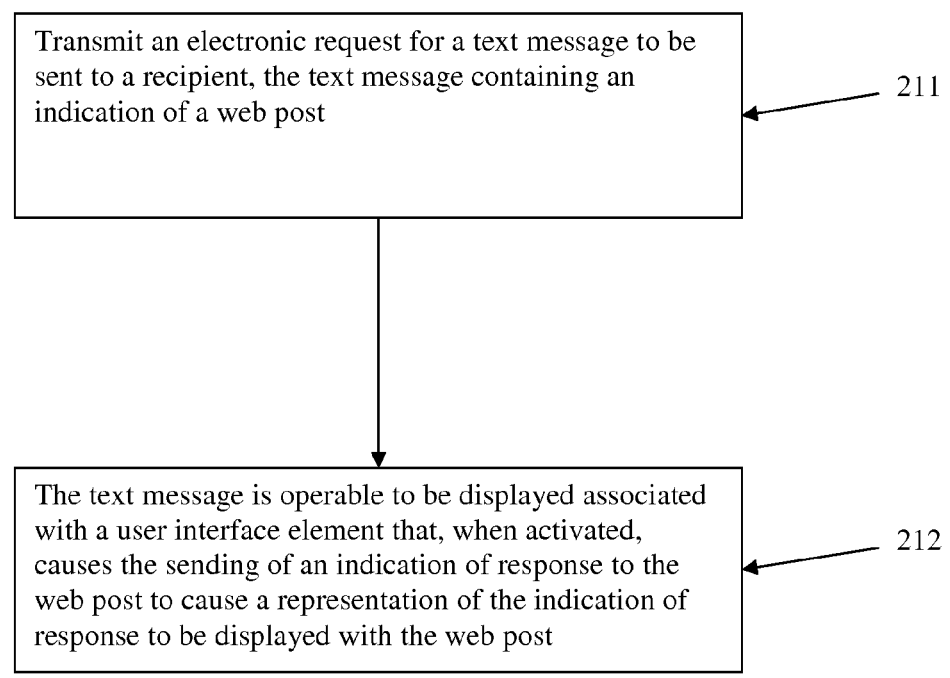
FIG. 2B is a flow chart illustrating an exemplary method for transmitting an electronic request to send a text message containing an indication of a web post that will allow the user to send an indication of response to the web post.

FIG. 2B illustrates an exemplary method 201 that can be performed in some embodiments of the invention. Embodiments may be used to enable the sending of an indication of response to a web post. The method may be performed by a computer system.

Exemplary method 201 may involve transmitting an electronic request for a text message to be sent to a recipient (Act 211). It may be specified that the text message should contain an indication of a web post, such as a URL. In some embodiments, the electronic request may be sent to an SMS or MMS gateway. The SMS or MMS gateway would then be able to send the appropriate text message.

In the method 201, the text message is operable to be displayed associated with a user interface element that, when activated, causes the sending of an indication of response to the web post to cause a representation of the indication of response to be displayed with the web post (Element 212). In some cases, the code for displaying a user interface element that, when activated, causes the sending of an indication of response to the web post to cause a representation of the indication of response to be displayed with the web post, may be in the text message itself. For example, the text message may embed a graphic for a user interface element that, when activated, causes the user's device to access a URL that calls a script. The script may record an indication of response in the indication of response database 128.

In other embodiments, the code for displaying a user interface element that, when activated, causes the sending of an indication of response to the web post to cause a representation of the indication of response to be displayed with the web post, may reside entirely, or in part, on the recipient device. For example, code on the recipient's device could be configured to display a button for every text message containing a URL, where the button causes an indication of "liking" the URL to be submitted to Facebook or to Google Plus or another relevant network. Thus, in an environment in which such code is installed on the recipient's device, all text messages containing an indication of a web post for which an indication of response is allowed could be displayed associated with a user interface element that, when activated, causes the sending of an indication of response to the web post to cause a representation of the indication of response to be displayed with the web post. If the environment is so configured, then all text messages containing an indication of a web post for which an indication of response is allowed would be operable to be displayed associated with a user interface element that, when activated, causes the sending of an indication of response to the web post to cause a representation of the indication of response to be displayed with the web post.

An analogous method to exemplary method 201 may be used in the context of networked posts that are not necessarily on the web by replacing each above use of the term "web post" with the term "networked post."

Figure 2C:
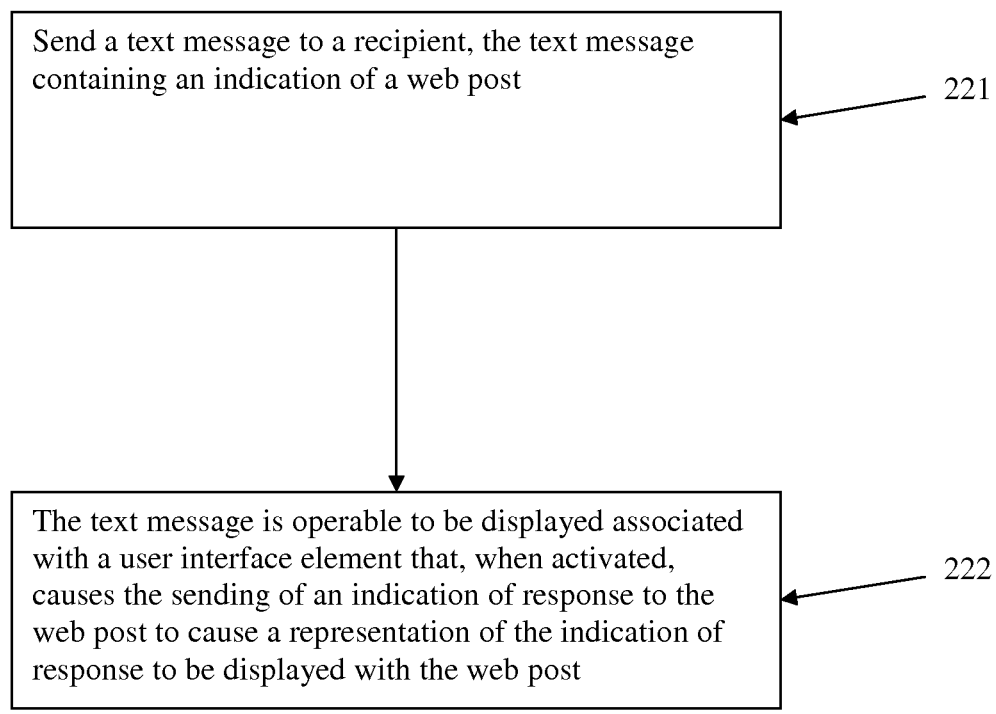
FIG. 2C is a flow chart illustrating an exemplary method for sending a text message containing an indication of a web post that will allow the user to send an indication of response to the web post.

FIG. 2C illustrates an exemplary method 202 that can be performed in some embodiments of the invention. Embodiments may be used to enable the sending of an indication of response to a web post. The method may be performed by a computer system.

Exemplary method 202 may involve sending a text message to a recipient (Act 221). The text message may contain an indication of a web post, such as a URL. The act of sending a text message can be performed according to any of the mechanisms previously discussed in this patent. For example, the act of sending the text message could be performed by a server; by a client (e.g., a mobile phone); by an SMSC or MMSC; by a MSC, BSC, BTS, or IP router (including IP routers in a mobile network or in the Internet backbone); by a wireless or Wi-Fi router; or by an SMS or MMS gateway.

In the method 202, the text message is operable to be displayed associated with a user interface element that, when activated, causes the sending of an indication of response to the web post to cause a representation of the indication of response to be displayed with the web post (Element 222). As previously discussed in the context of method 203, the text message may be so operable due to code in the text message or due to code installed on the recipient device.

An analogous method to exemplary method 202 may be used in the context of networked posts that are not necessarily on the web by replacing each above use of the term "web post" with the term "networked post."

III. Exemplary User Interfaces

A wide variety of user interfaces could be used in embodiments of the invention. Some exemplary user interfaces are presented below, without intending to place a limit on the kinds of user interfaces that may be used.

Figure 3:
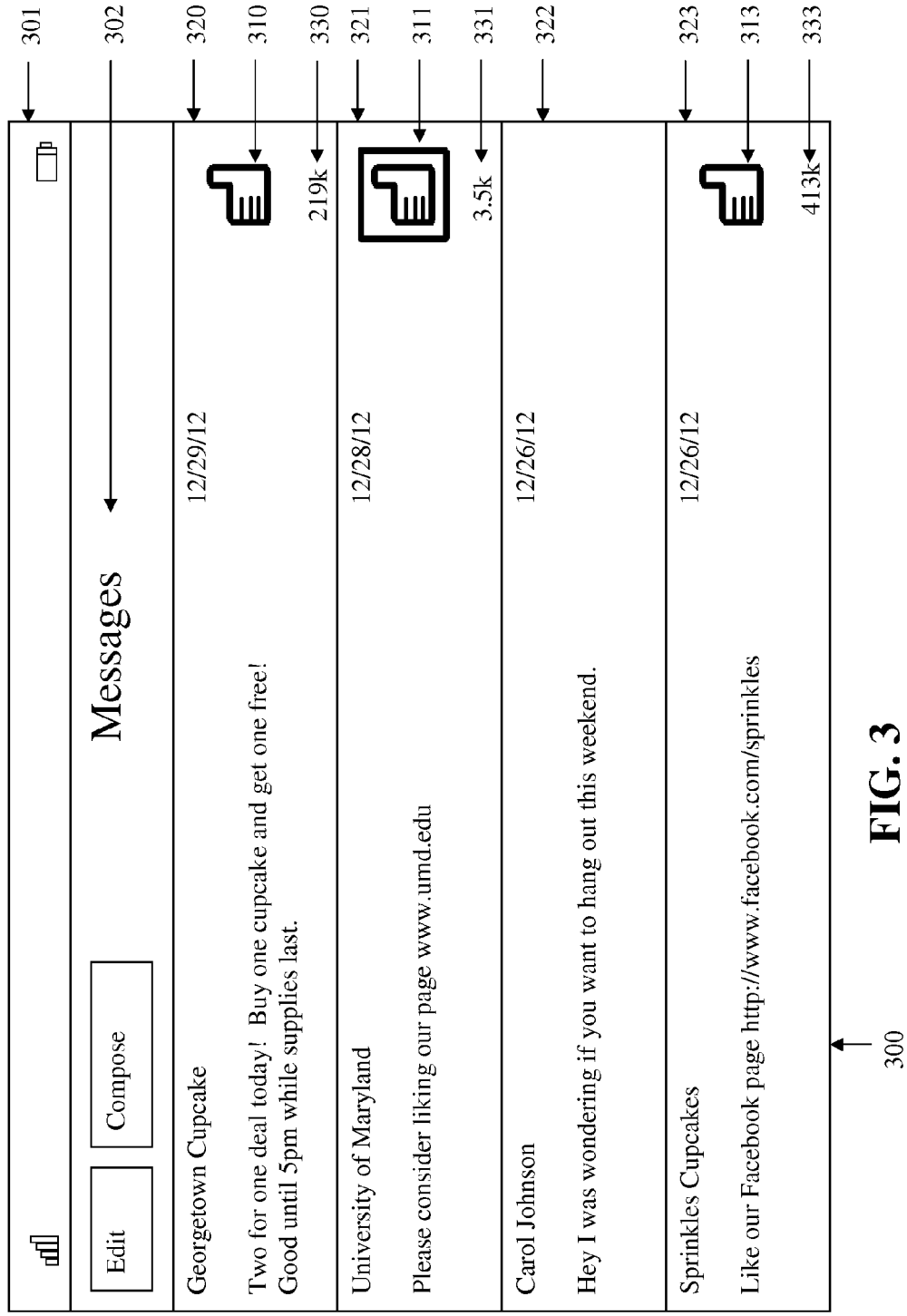
FIG. 3 illustrates an exemplary user interface for showing text messages in an inbox.

FIG. 3 illustrates an exemplary user interface 300 that may be used in some embodiments. This view shows an inbox of a text message program. It shows text messages received from various other parties. The status bar 301 may show status information for a device, such as reception quality and battery life. The header bar 302 may provide various buttons for performing actions. For example, the Edit button may be used to edit messages (including deleting them) and the Compose button may be used to open a new text message for composition. The view also shows text messages 320, 321, 322, and 333 that have been received by the user. Each one may display associated information such as who it is from, partial contents of the message, and a date. Some of them include a thumbs up button (310, 311, 313) for sending an indication of response. Some of the messages include an optional number element (330, 331, 333) for showing the number of indications of response the web post associated with the message (320, 321, 323 respectively) has received. The number elements 330, 331, and 333 may aid the user in recognizing which posts are popular but are not required in every embodiment.

The term "associated" is used to refer to items that are related to each other, for example because of the way they are displayed. For example, the From field "Georgetown Cupcake" is clearly associated with the message 320 and not any of the messages 321, 322, or 323. Similarly, the thumbs up button 310 and number element 330 are clearly associated with the message 320 and not any of the messages 321, 322, or 323. Displaying items to be "associated" with each other is often helpful to illustrate a relationship between the items.

The thumbs up button 311 and number element 331 are associated with message 321, and the thumbs up button 313 and number element 333 are associated with message 323.

The term "on" may also be used in this context. For example, the From field "Georgetown Cupcake," the partial contents "Two for one deal today . . . ," the date "12/29/12," the thumbs up button 310, and the number element 330 are all "on" message 320. This is in accordance with the plain and ordinary meaning of "on" (a possible definition of "on" is "to be positioned in or in contact with an outer surface").

I contemplate that the word "associated" shall be broader than "on" and shall prevent infringers from creating trivial design-arounds where certain elements are "near" or "related to" an item but not literally "on" the item.

In this example, the thumbs up buttons 310, 311, and 313 are "like" buttons because they send an indication that the user "likes" the relevant web post when the user activates the button. Other kinds of buttons can be used, such as "dislike" buttons, "support" buttons, "oppose" buttons, "favor" buttons, "disfavor" buttons, "vote up" buttons, "vote down" buttons, "agree" buttons, "disagree" buttons, and so on, which would each send the corresponding indication of response (dislike, support, oppose, favor, disfavor, vote up, vote down, agree, disagree, etc.).

The message 320 recites a consumer offer from Georgetown Cupcake. The exemplary message includes an embedded URL that tells the device what web post is associated with this text message, which allows the device to determine (a) how many indications of response have been received for display in element 330 and (b) what page to send the indication of response to when the element 310 is activated. The count in number element 330 can be determined, for instance, by querying the server hosting the web post (such as server 120) upon which the server can access its database (such as indication of response database 128) and reply to the device with the appropriate count. In this case, the message 320 does not display the embedded URL. This may be a default behavior, or hiding the URL could have been specified by the sender, for example by using a tag such as <hide></hide>.

For a consumer offer like message 320, the corresponding web post may be a post specific to the offer, such as a blog post describing the offer, or it may be a post that describes the business in general (such as a post generally about Georgetown Cupcakes), in addition to other possibilities. In the exemplary message 320, the sender has decided to use the general Facebook page of Georgetown cupcakes (http://www.facebook.com/georgetowncupcake) as the relevant web post, which currently has over 219,000 likes. Use of a general post makes sense in some cases because it allows a business to accumulate a large number of user responses over time, rather than having the responses only be recorded for specific offers that will later be forgotten.

The message 321 is from the University of Maryland. It directly asks the user to like a page. Notice that an indication of response from different text messages on the device can go to various sites. The "like" from message 320 is directed to Facebook, but the "like" from message 321 may go to a site umd.edu that is hosted by the University of Maryland. The university may record these "likes" using its own privately managed system.

Also, the device may display indications of when the user has already sent an indication of response to an item. In this example, the thumbs up element 311 has been drawn with a box around it to show that the user has already "liked" the message 321.

The message 322 does not include any indication of a web post and so does not include an element for sending an indication of response or a count of indications of response.

The message 323 is a message from a vendor asking the user to like a post and displaying to the user the URL of the post. Displaying the URL to the user may be helpful in some cases in convincing users to send an indication of response because it tells a user exactly what he would be responding to.

In addition to the number elements 330, 331, and 333, some embodiments may display a list of the users who have sent the indications of response. For example, the list could be displayed next to or below the interface elements 330, 331, and 333. It may not be possible to list everyone's identity in the space available, so a partial list could be used such as "Mark Garcia, Abby Lewis, and 2 others." Preference may be given to listing names (or other identifiers) of people who are contacts or friends of the user, where contact and friend information may be stored on the user's device or may be downloaded from a server such as a social network website. The list of identifiers could also be displayed in a separate pane or window. In some cases, a list of identifiers may be only be displayed after some user interaction, such as clicking on or hovering over one of the numbers 330, 331, 333.

Furthermore, optionally, the system may allow a user to undo the sending of an indication of response. For instance, in response to the user clicking on a boxed thumbs up element like 311, the device may send an indication to the server 120 to indicate that the prior-sent indication of response should be deleted. The server 120 may delete the indication of response from the indication of response database 128.

Figure 4A:
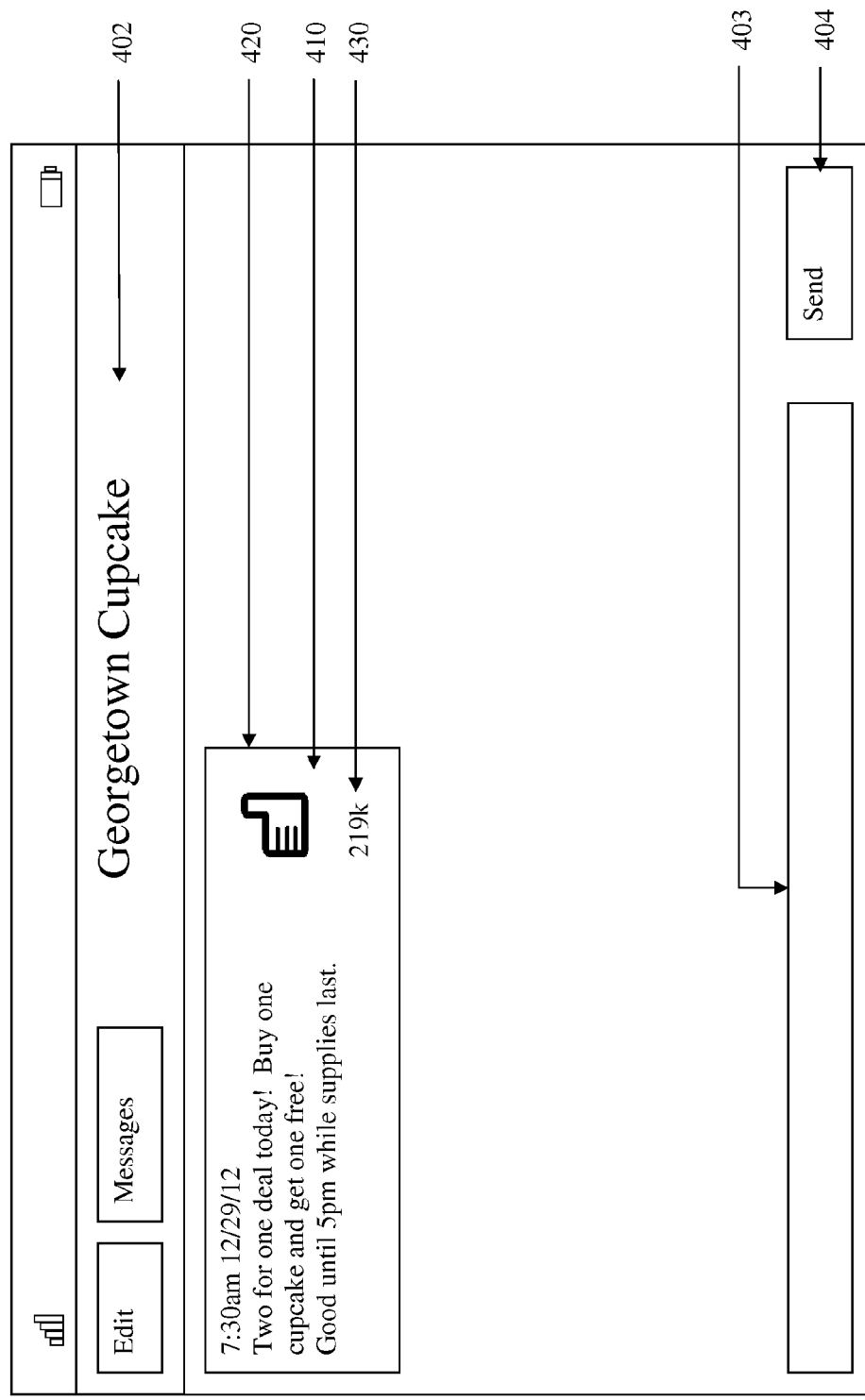
FIG. 4A illustrates an exemplary user interface for displaying a text message conversation.

FIG. 4A shows an exemplary interface 440 for displaying a text message conversation. A text message conversation comprises text messages that are to and from a counter-party (e.g., Georgetown Cupcake) or multiple counter-parties (e.g., a group). Messages to the user may be displayed on the left side of the screen and messages from the user may be displayed on the right side of the screen. In this case, there is only one text message 420 in the conversation, and it is from Georgetown Cupcake to the user. The header bar 402 specifies that this conversation is with "Georgetown Cupcake." It also provides a button to edit messages and a button to go back to the inbox view ("Messages").

The text box 403 is for entry of a new text message. The send button 404 causes sending of the text in text box 403 as a new text message.

The text message 420 has an associated date and time (7:30 am 12/29/12) and associated text (Two for one deal . . . ). It also has an associated thumbs up element 410 and number element 430. The thumbs up element 410 is for causing the sending of an indication of response. The number element 430 is for showing the number of indications of response for the corresponding web post.

The text box 403 and send button 404 are not associated with the message 420 nor would box 403 or button 404 be associated with any previously received or previously sent text message. The box 403 and button 404 do not relate to previously received or previously sent text messages. They are for sending new messages.

It has been previously discussed how the indication of response button, such as button 410, may be embedded in the text message or may be a previously installed (or factory default) button available on the device.

An indication of response button could be embedded in a text message using an HTML-like coding, for instance:

---
Embedded Button
---

```
<a
href="http://www.facebook.com/plugins/like_now.cgi?href=Geo
rgetownCupcake&id=2025550100"> <img
src=http://www.facebook.com/images/likebutton.jpg> </a>
```

The above code creates a hyperlink that, when activated, causes the like_now.cgi script to be run on the Facebook server. In this example, I am assuming that the like_now.cgi script takes as input a post name and a user id, such as a phone number, and records an indication of the user's response with the post. Such scripts are known in the art. An exemplary script may create a database entry in, for instance, the indication of response database 128. The database entry may record an indication of the post (such as "GeorgetownCupcake"), a user id (such as the phone number "2025550100"), and a time that the indication of response was received. Thus, whenever some user accesses the post with identifier "GeorgetownCupcake" the server knows that the user having id 202-555-0100 has submitted an indication of response to the post.

The above code displays the hyperlink as an image located at the hypothetical web address "http://www.facebook.com/images/likebutton.jpg."

HTML is short for HyperText Markup Language. It is a markup language used for displaying web pages or other information. Markup languages allow the use of tags or other annotations to add information to a document. HTML tags can be used to specify the appearance or behavior or various display elements such as text and images. XML is another markup language and is often used to organize data when it is transported or stored. XML allows tags to be defined by the developer.

The number element 430 could also be embedded in the text message. Exemplary pseudocode in jQuery-like form follows:

---
Embedded Number Element
---

```
$.get("www.facebook.com/plugins/num_likes.cgi",
   { href: "GeorgetownCupcake" }, function(data){
   $('body').append( "Count: " + data.count ); }, "json");
```

The above pseudocode uses the format of the jQuery.get( ) function. The first parameter is a CGI script to call. The second parameter is a set of data values to pass to the CGI script, listed as key-value pairs. Thus, in this case, the num_likes.cgi script is called for the post "GeorgetownCupcake." I am assuming that the script takes as input a post name and returns the number of indications of response to that post. Such scripts are known in the art. The third parameter is a handler function that is executed upon success. In this case, the handler function appends a count of the indications of response to the body of the text message. The fourth parameter indicates that the type of data expected from the server is in json format.

On the other hand, the code for displaying an indication of response element 410 and number element 430 may be previously installed on the device. For example, the code may be installed by default, or it may have been installed as part of a device software update. An exemplary pseudocode algorithm for implementing this functionality is shown below:

---
Device-installed Button and Number Element
---

1: Parse the text message to identify any indication of a web post
2: If an indication of a web post is found, determine whether the device is configured to send an indication of response to that kind of web post
3: If the web post is of a kind that the device is configured to send an indication of response to, then display a button that will send an indication of response

| Device-installed Button and Number Element |
|---|
| to the appropriate server when activated<br>4: Also if the web post is of a kind that the device is configured to send an indication of response to, query the appropriate server for the number of indications of response it has received to the post and display that number |

The first step may be performed, for example, by using regular expressions to search for web posts. For example, a regular expression may be used to detect all URLs. Various other kinds of parsers could also be used. For example, parsers can be generated using Flex/Bison or Lex/Yacc.

The second step may be performed by storing a list of web domains on the device that accept indications of response. For example, the device may recognize that all URLs of the form "http://www.Facebook.com/XYZ" correspond to a Facebook page for XYZ that may receive an indication of "liking" the page. Similarly, a URL of the form "http://www.arbitrary_blog.com/XYZ" may be known to correspond to a post on a blog that may receive an indication of "liking" the blog post, and a URL of the form "http://www.arbitrary_search_engine.com/XYZ" may be known to correspond to the search result XYZ.com on a search engine that may receive an indication of "voting up" the search result.

Alternatively, the device may be configured to send indications of response to a particular domain, such as Facebook.com. In that case, the device may associate a web post to a text message without requiring that the text message itself contain a URL to the web post. For example, suppose a text message is from a company XYZ or mentions the company XYZ. The device may then associate the text message to the post at www.Facebook.com/XYZ, which is the Facebook page for XYZ. Thus, a text message from Georgetown Cupcake or mentioning Georgetown Cupcake could be associated with the post at www.Facebook.com/GeorgetownCupcake without that URL being actually embedded in the text message. In this embodiment, the mere name "Georgetown Cupcake" or "XYZ" is an indication of a web post, despite no web domain being specified (because the device is configured to provide the web domain). The device may check with the server (e.g., Facebook.com) to determine whether there is a web post corresponding to the identifier that will accept indications of response.

In the third step, the device has determined that the text message relates to a web post that accepts indications of response. The device then displays a button that, when activated, causes an indication of response to the post to be sent to the appropriate server. The image data for the button may be stored locally on the device or may be on a remote server. In one embodiment, the indication of response may be sent by calling a script on the appropriate server, where the script may record the indication of response in a database. In one simple implementation, the device could generate an html-like markup to display a button that, when activated, calls a server-side script. For example, the device could generate the Embedded Button code that was presented above, rather than requiring that such code be embedded in the text message. In another embodiment, the indication of response may be sent by sending an email or text message to the appropriate server with content identifying the post and indicating that the user wants to record an indication of response to the post.

In the fourth step, as before, the device has determined that the text message relates to a web post that accepts indications of response. The device may display an indication of the number of responses that the post has received. This may be performed by querying the corresponding server, such as by calling a server-side script that accesses a database such as indication of response database 128 and returns a count to the client. For example, in one simple implementation, the device could generate the jQuery-like code for the Embedded Number Element that was presented above, and run it.

Figure 4B:
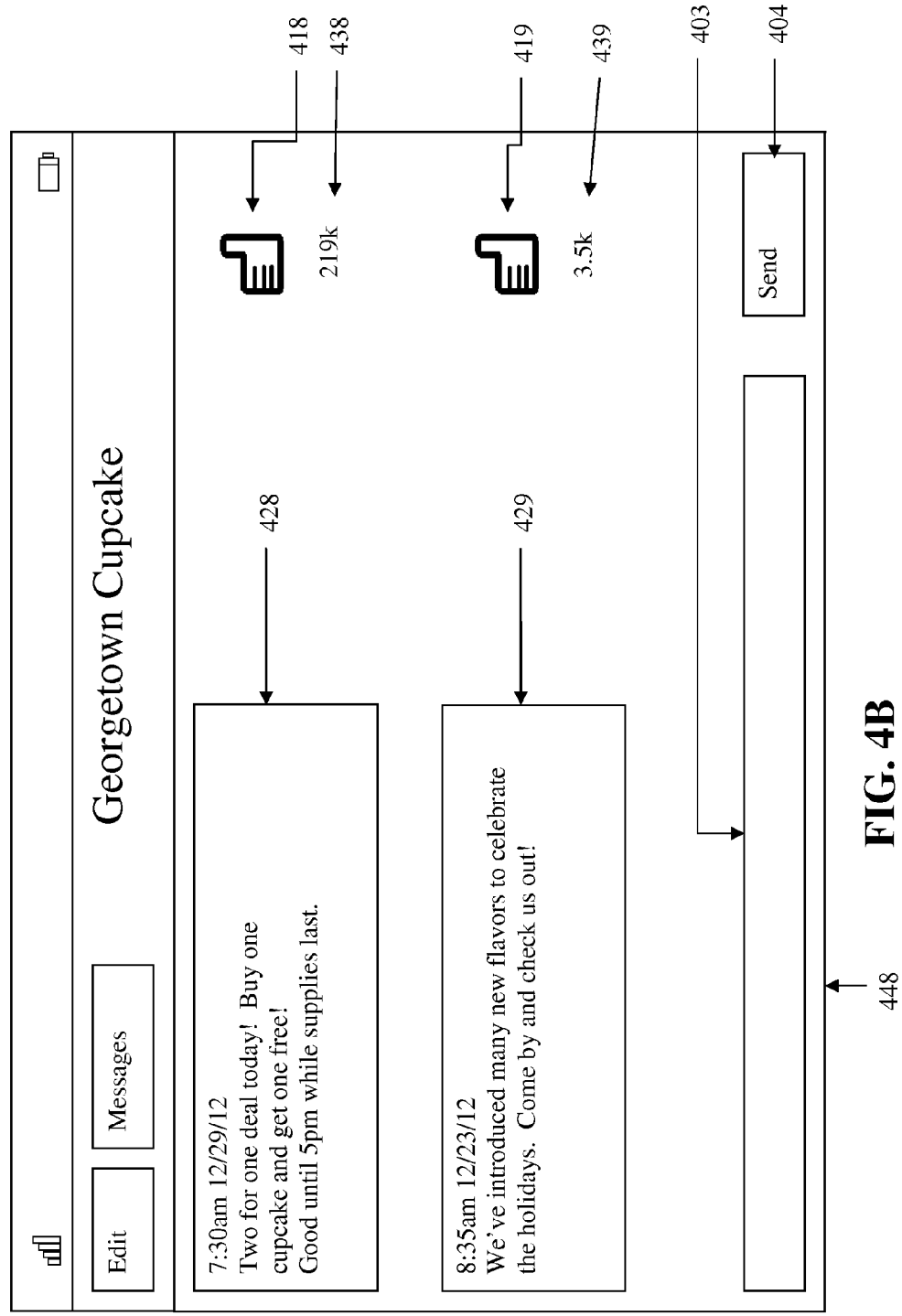
FIG. 4B illustrates another exemplary user interface for displaying a text message conversation.

FIG. 4B illustrates another exemplary user interface 448 for displaying a text message conversation. The interface 448 further illustrates how a user interface element may be associated with a text message without being literally "on" the text message. The thumbs up element 418 and number element 438 are both associated with the text message 428. The thumbs up element 419 and number element 439 are both associated with the text message 429. The display of these elements next to the corresponding text messages indicates to the user that these elements are associated with the corresponding text messages. The new text message field 403 and send button 404 are general interface elements and are not associated with text message 428 or text message 429.

Figure 4C:
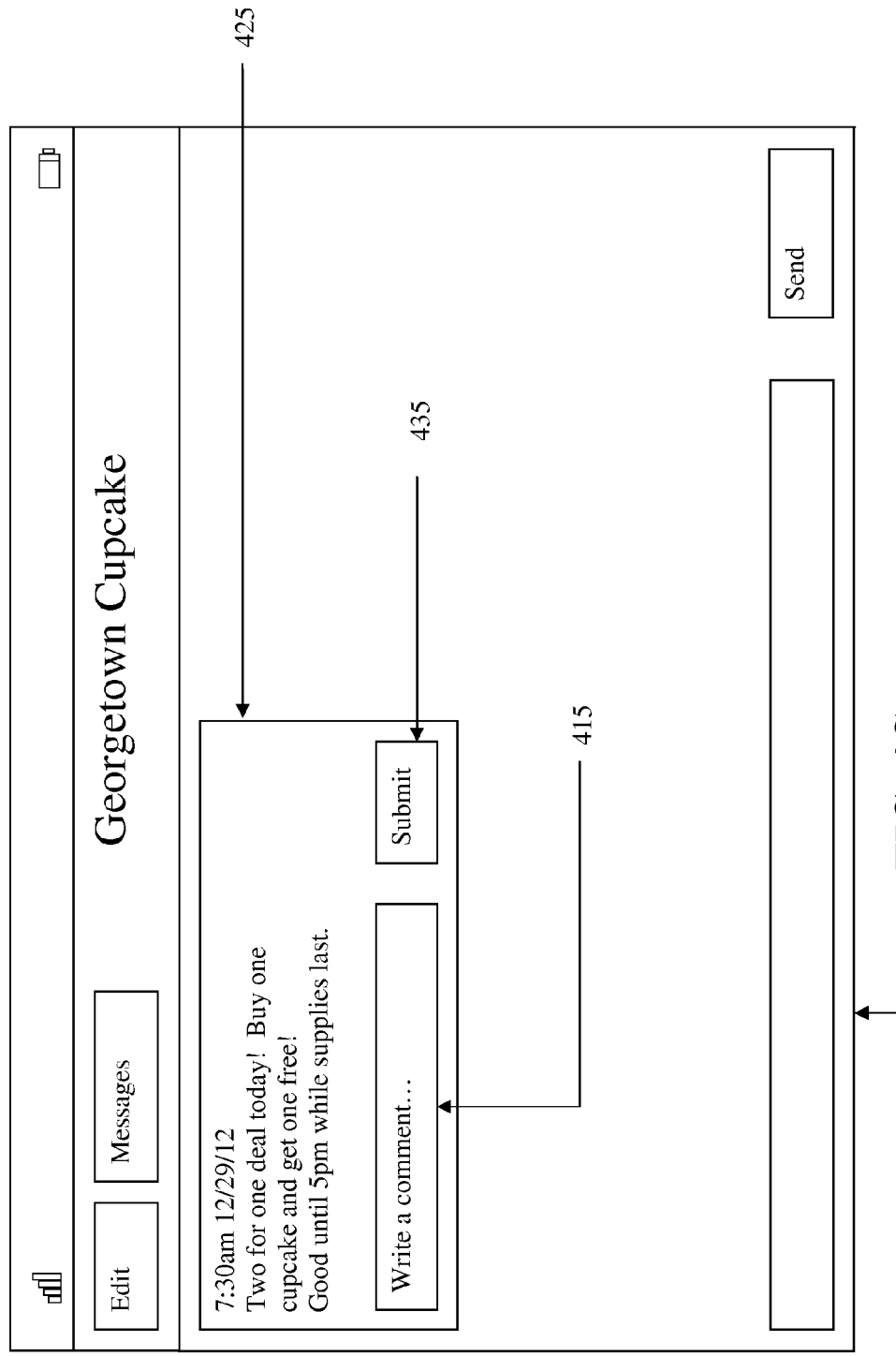
FIG. 4C illustrates an exemplary user interface that may be used to send a comment to a post.

FIG. 4C illustrates an exemplary interface 445 that may be used to send a comment to a post by using a comment field in a text message. The text message 425 is from Georgetown Cupcake and contains a hidden URL to a corresponding web post, such as the Georgetown Cupcake page on Facebook. The user may enter a comment in the comment field 415 and press the submit button 435 to cause the user-entered comment to be submitted to the server hosting the Georgetown Cupcake post for storage in a database. When some user accesses the Georgetown Cupcake post, the comment may be retrieved from the database for display.

Exemplary code in HTML-like format that could be used to embed a comment field in a text message follows:

| Embedded Comment Field |
|---|
| <form name="input"<br>action="www.facebook.com/plugins/record_comment.cgi?href=GeorgetownCupcake&id=2025550100&"><br><input type="text" name="comment"><br><input type="submit"><br></form> |

The above HTML-like code may be displayed as a form in a text message. The <input type="submit"> code causes display of a submit button. The <input type="text" name="comment"> code causes display of a text field where a comment may be entered. When the comment is submitted, the script record_comment.cgi is called on the Facebook server. It is called with the parameters href=GeorgetownCupcake, id=2025550100, and comment=[user-entered text]. The record_comment.cgi script may create a database entry recording an indication of the post (e.g., GeorgetownCupcake), the user id (202-555-0100), the user-entered text, and the date and time of entry. Thus, whenever some user accesses the post with identifier "GeorgetownCupcake" the server knows that the user having id 202-555-0100 has the submitted the comment [user-entered text] for that post.

Methods for interpreting HTML-like code and displaying it are known. For example, the Mozilla Firefox browser (https://www.mozilla.org/projects/firefox/) and Chromium browser (http://www.chromium.org/Home) both interpret HTML code for display and are both open source.

In other embodiments, the code for displaying the comment field 415 and submit button 435 could be previously installed on the device. Exemplary pseudocode for implementing the comment field follows:

---
Device-installed Comment Field
---
1: Parse the text message to identify any indication of a web post
2: If an indication of a web post is found, determine whether the device is configured to send an indication of response to that kind of web post
3: If the web post is of a kind that the device is configured to send an indication of response to, then display a comment field that will send an indication of response to the appropriate server when activated
---

The first two steps have already been discussed. The third step may be implemented for instance by having the device display a comment field that, when activated, calls a server-side script that stores the comment in a database. For example, the device could generate the Embedded Comment Field code that was presented above, rather than requiring that such code be embedded in the text message. In another embodiment, the indication of response may be sent by sending an email or text message to the appropriate server with content identifying the post, indicating that the user wants to record an indication of response to the post, and comprising the contents of the user comment.

In some embodiments, previous comments to the web post indicated could be displayed in the text message. This may be accomplished via client-side code that calls a script on the server that reads the indication of response database to retrieve user comments and return them to the device.

Figure 4D:
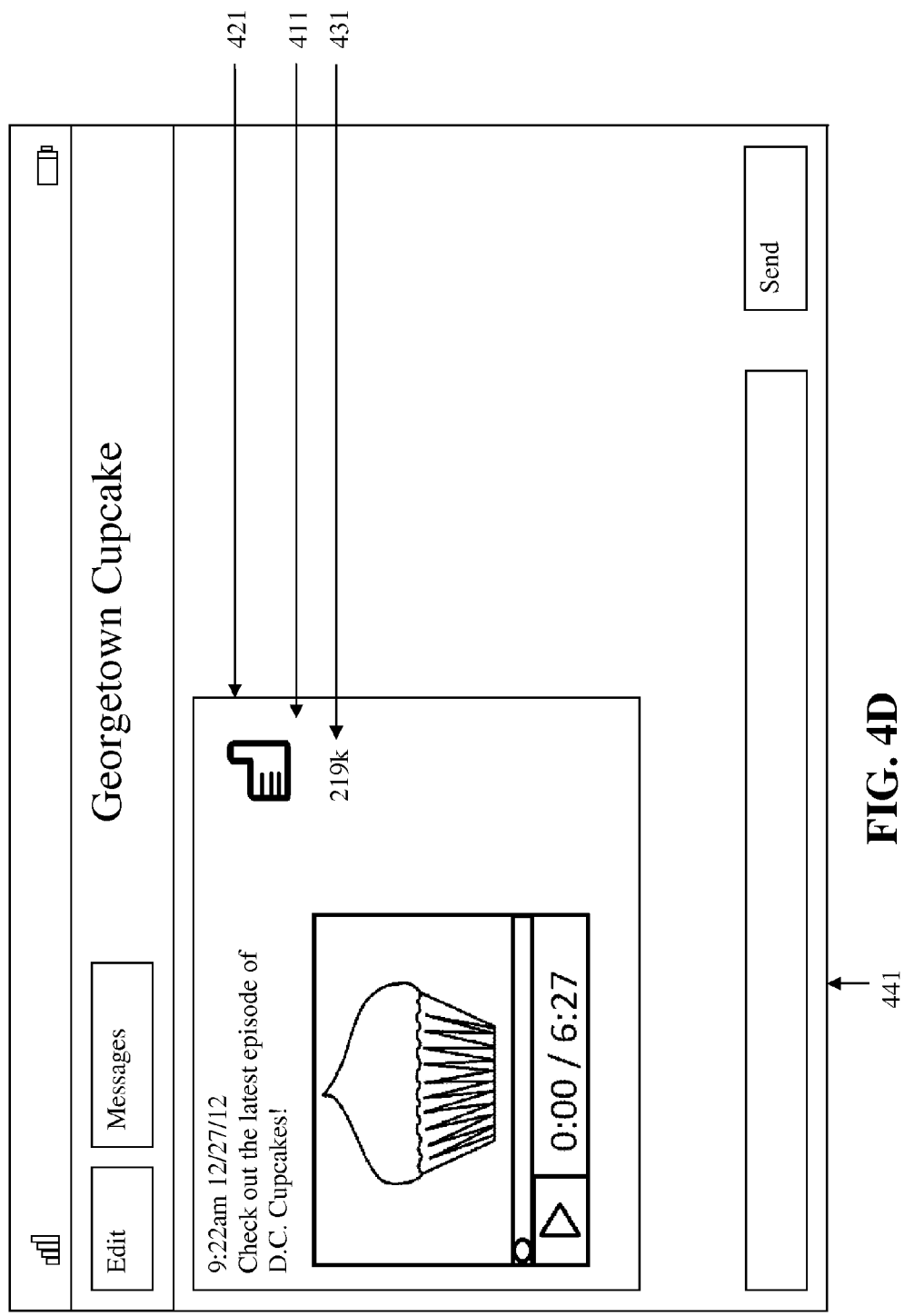
FIG. 4D illustrates an exemplary user interface that may be used to display a video in a text message.

FIG. 4D illustrates an exemplary interface 441 used in some embodiments to display dynamic content in a text message. Dynamic content in a text message is content that is operable or changeable within the text messaging program itself. For example, a text message containing only static text is not dynamic. Similarly, a text message having a static image file or a static hyperlink to an online video (that opens in a separate program) is not dynamic. However, a text message that opens a video file so that it plays within the text messaging program is dynamic. Similarly, a text message that loads web content from a link, where the web content may change in the text message in response to changes on the server, has dynamic content.

The text message 421 includes a video displayed in a video player. The user may use the controls of the video player to play the video within the text messaging program itself. The text message 421 also includes an associated thumbs up element 411 for sending an indication of response to a web post (once again the URL of the web post is hidden, but the web post is assumed in this example to be the Facebook page of Georgetown Cupcake) and a number element 431 showing the number of indications of response received.

Figure 4E:
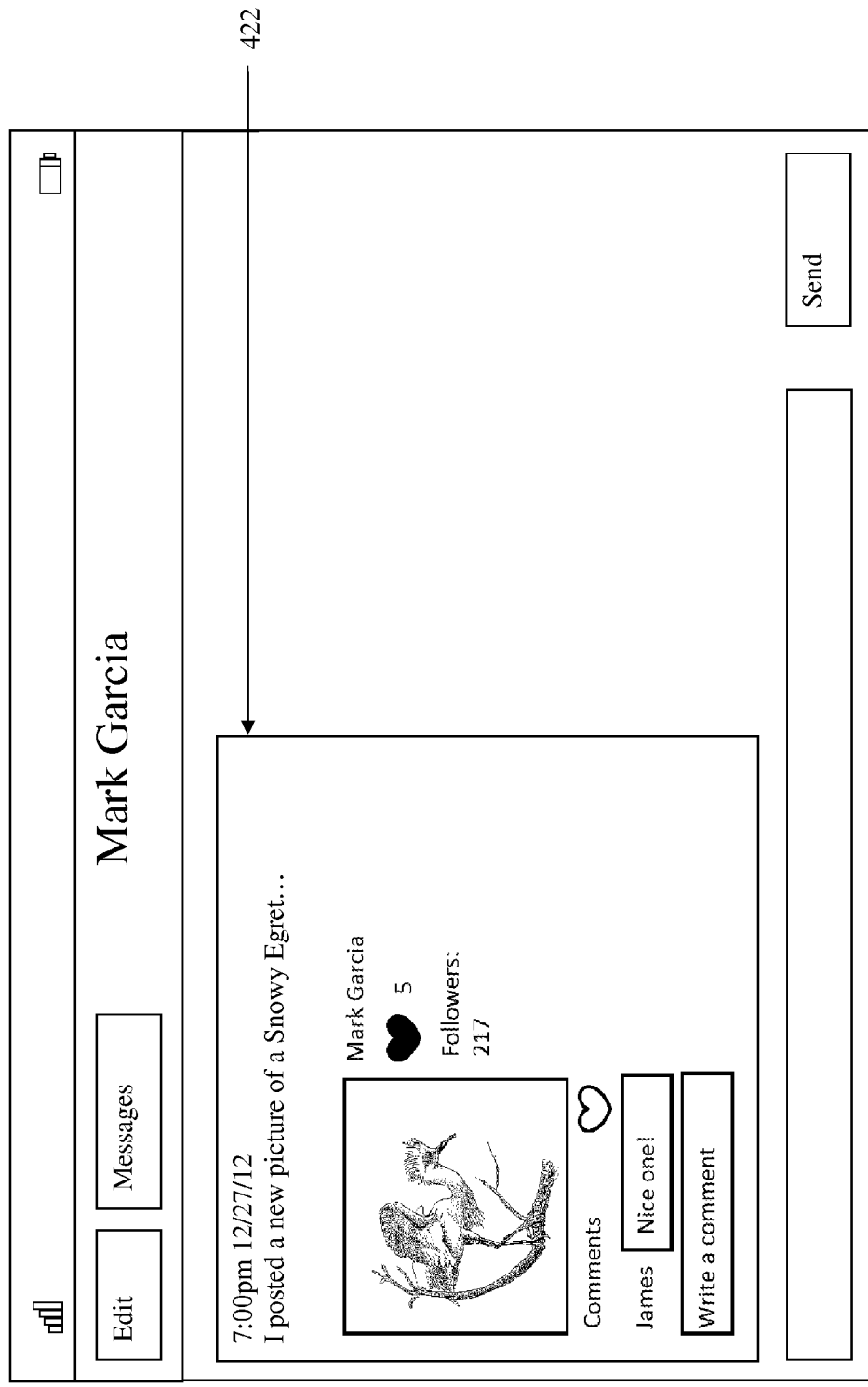
FIG. 4E illustrates an exemplary user interface that may be used to display dynamic content from a photo sharing web site.

FIG. 4E provides another exemplary interface 442 in which dynamic content is displayed in a text message. In this example, text message 422 presents a dynamic view of web content. As the web content is updated on the server, the web content will also change the way it is displayed in the text message. In this case, the web content comes from a post on a photo sharing service such as Instagram. The post accepts comments. There is currently one comment from James. If another user were to post a comment, the additional comment would then be displayed in this text message 422. Thus, the comments are dynamically updated. Similarly, the display of the number of Mark Garcia's "followers" is dynamic because if another user were to follow Mark, then the display would change from 217 to 218 in the text message.

There is also an empty heart button shown below the image of the Snowy Egret (image credit: Robert Savannah, U.S. Fish and Wildlife Service) that the user may click on to cause an indication of liking the image to be stored on the server. The number of likes the image has received (5) is shown next to the filled heart below Mark Garcia's name. Thus, in this example, the empty heart button is an element that, when activated, causes an indication of response to be sent to the server to cause a representation of the indication of response to be displayed with a web post (Mark Garcia's Snowy Egret post).

Also, the user is presented with the option of writing a comment for the post. The user comment field in the text message 422 is also a user interface element that, when activated, causes an indication of response to be sent to the server to cause a representation of the indication of response to be displayed with a web post. This is because submitting the comment causes the comment to be stored with the post and be displayed by the server with the post.

For example, when the user submits the comment, such as by pressing enter on a keypad (not shown), the comment is submitted to a server (such as server 120) that is hosting a web post (such as web post 121). The server may store the comment in an indication of response database 128. Then, when some user requests access to the web post 121, the server may retrieve all indications of reply (e.g., all user comments) from the indication of response database 128 and display them.

A device can display dynamic content in a text message by parsing the text message to identify a server and resource location from which content may be downloaded dynamically. For example, a text message may contain a URL or name that identifies a server. By following the (for example) URL to content stored on a server, the display of the content in the text message program can change in response to changes to the content on the server.

Exemplary pseudocode for displaying dynamic content follows:

---
Dynamic Content
---
1: Parse the text message to identify any indication of a web post
2: If an indication of a web post is found, determine whether the device is configured to display this kind of web post dynamically
3: If the web post is of a kind that the device is configured to display dynamically, query the server hosting the web post for additional content
4: Also if the web post is of a kind that the device is configured to display dynamically, display the content with one or more controls allowing the user to interact with the content
---

The first step has already been discussed.

The second step can be performed by an algorithm that parses the web post to determine whether it should be displayed dynamically. For example, the algorithm might recognize that all content from a particular web domain (e.g., Facebook.com) should be displayed dynamically.

Alternatively, it might recognize that all files of a certain type (e.g., videos) should be displayed dynamically.

In the third step, the device may access a URL or other identifier provided in the text message to download content from a remote server. The URL may call a script on the server that can assist in this process.

In the exemplary interface 441, the dynamic content was a video. Thus, the text message may have embedded a link to the video such as "http://www.hulu.com/watch/441146." The device may access the Hulu web server and provide the video identifier 441146 to thereby query the Hulu server for additional data to allow for dynamic content. For example, this may include the image of a cupcake to display in the video player. It may also include metadata such as a description of the video, author, date of creation, and so forth. Furthermore, the device could start downloading the video itself (alternatively, it may wait until the user actually activates the video).

In the exemplary interface 442, the dynamic content was various interface elements related to a photo sharing service. Thus, the text message may have embedded a link to a photo such as "http://www.instagram.com/snowy_egret42.jpg." The device may access the Instagram web server and provide the image identifier snowy_egret42.jpg. In response, the Instagram server may provide additional data about the image and about the author of the image. For example, the Instagram server may provide the number of likes of the image, the content of any comments, the user id of the author, and the number of followers of the author.

By accessing the content on the server at various times, the device may change its display of the text message based on changes on the server.

In the fourth step, the device may display the text message content with one or more controls allowing the user to interact with the content.

In the exemplary interface 441, the text message program provided a video player. The video player may be embedded as a component of the text message program. A video player may be implemented by using known methods. Open source video players include VLC media player, Video.js, Miro, Kaltura, and Open Video Player.

In the exemplary interface 442, the text message program provided user interface elements for leaving a comment or liking an image. Methods for providing those user interface elements have been discussed above. For example, one could program the device to display buttons that call a script on a remote server that thereby change the content on the server.

IV. Displaying Web Posts with Indications of Response

As described above, the term "web post" refers to web content and may refer to a web page or a sub-element of a web page. Web posts may be displayed with indications of response, which may be retrieved from an indication of response database 128. A few illustrative examples of web posts with indications of response are presented in this section.

Figure 5:
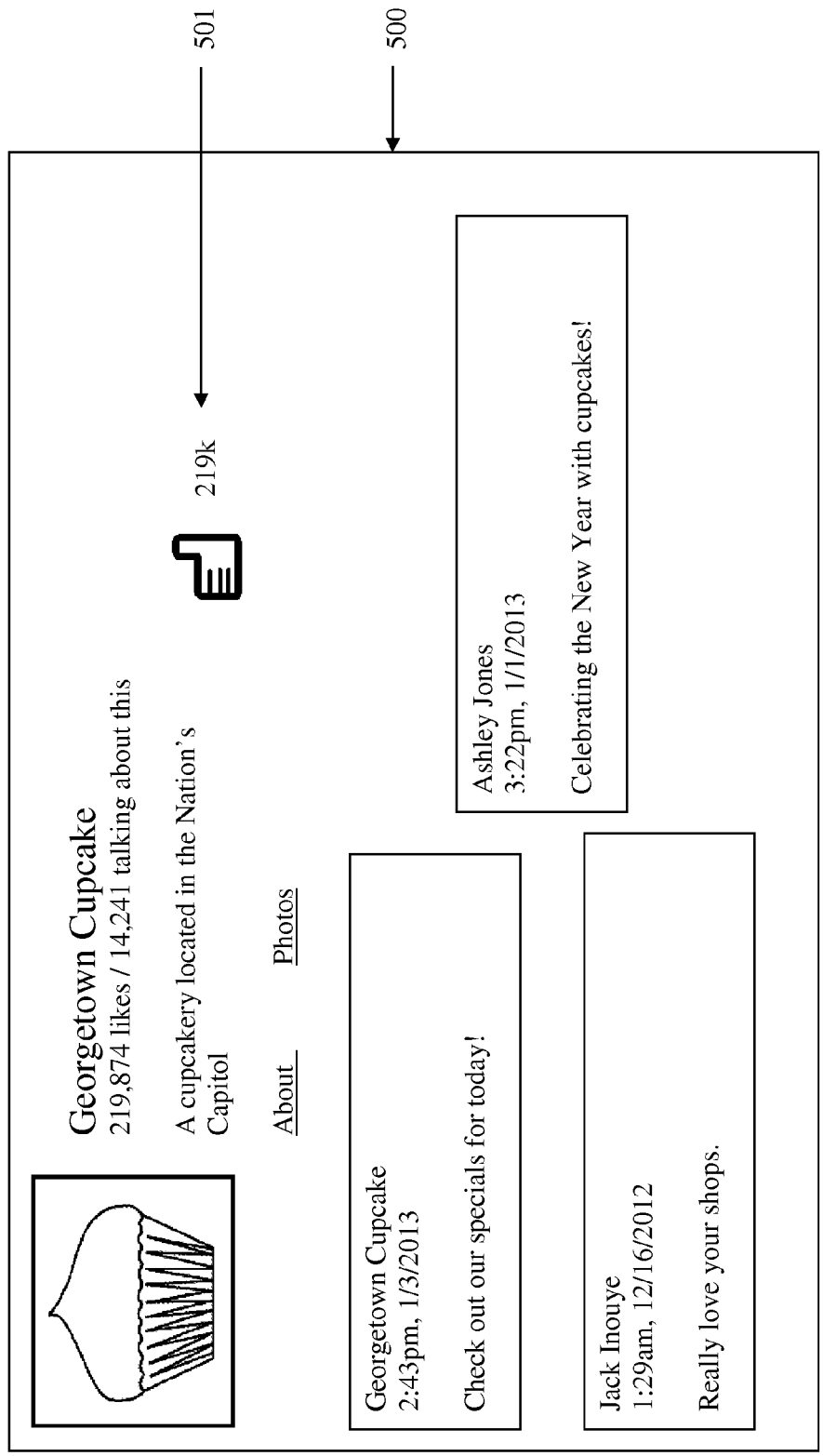
FIG. 5 illustrates an exemplary page on a social network displaying a count of the indications of response received.

FIG. 5 shows an illustrative page 500 on a social network. This social network page is a web post. A social network is a web site implementing a virtual community. Users can connect to one another, for example as friends, contacts, connections, followers/followee, and so forth. Some social networks have "pages" for different things, such as companies, shops, universities, hobbies, ideas, activities, and so forth. Page 500 shows a page for Georgetown Cupcake. The element 501 shows that this page has received 219 k indications of response. A count of indications of response received is a kind of representation of indications of response. Some of those indications of response may have been submitted via methods described in this patent. Other aspects of page 500 include a photo, a description, a link to an about page, a link to a photo gallery, an element for liking the page, and a wall allowing for posts.

Figure 6:
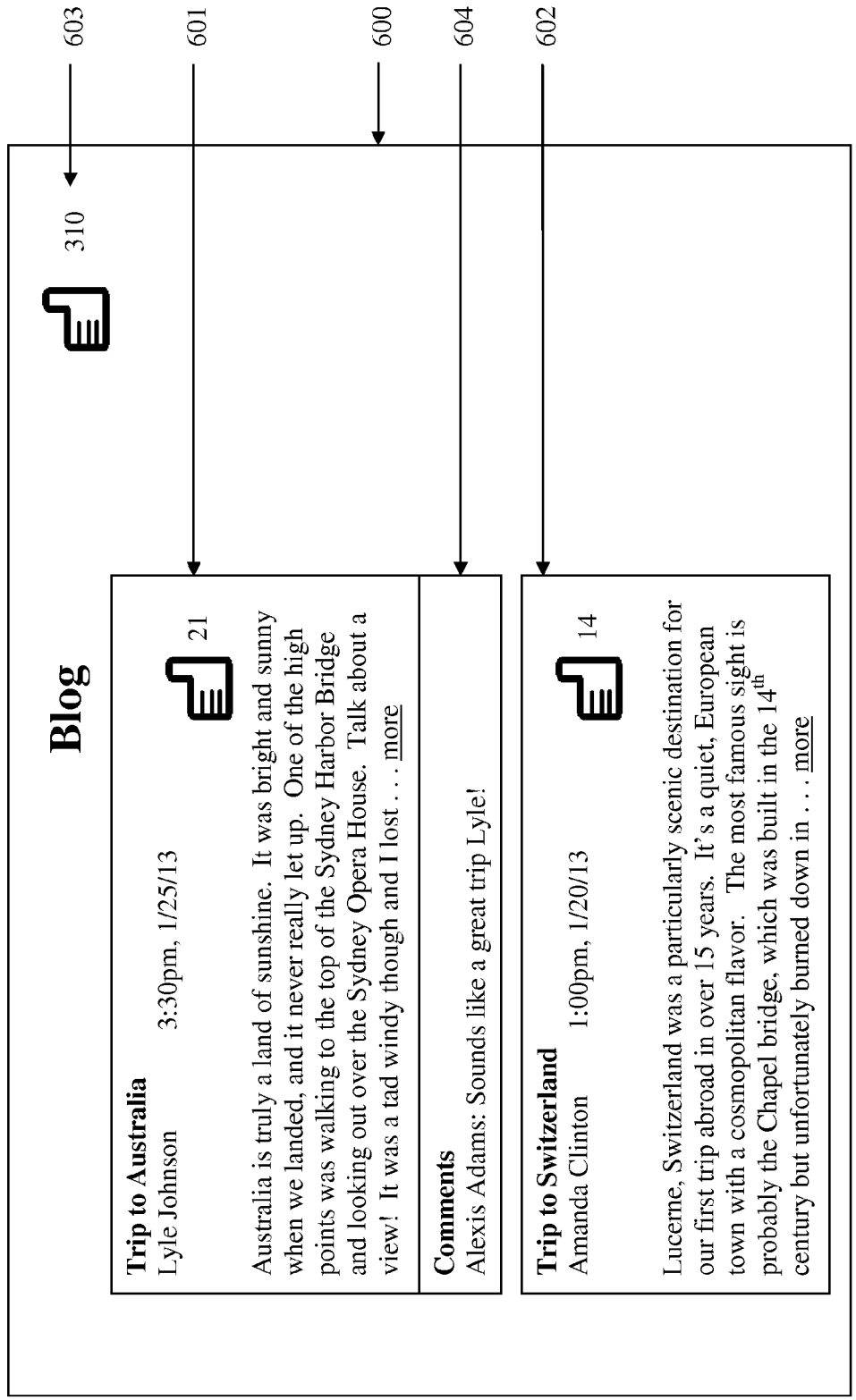
FIG. 6 illustrates an exemplary blog displaying a count of the indications of response received for the blog and various posts.

FIG. 6 shows an illustrative blog 600 with two blog posts 601 and 602. The blog posts 601 and 602 are web posts. The blog 600 is also considered a web post. The blog 600 tracks indications of response at element 603. The individual blog posts 601 and 602 also track their own indications of response. A blog is a web site on which an individual or group of users record opinions, information, etc. for example in the form of posts. In some embodiments, comments (such as comment 604) may be displayed below a blog post. Comments may come from users who have read the blog post. A comment may consist of text or multimedia and often includes an identifier of the user who wrote the comment. Some of the indications of response displayed for the blog 600 and blog posts 601 and 602 may have been submitted via methods described in this patent.

Figure 7:
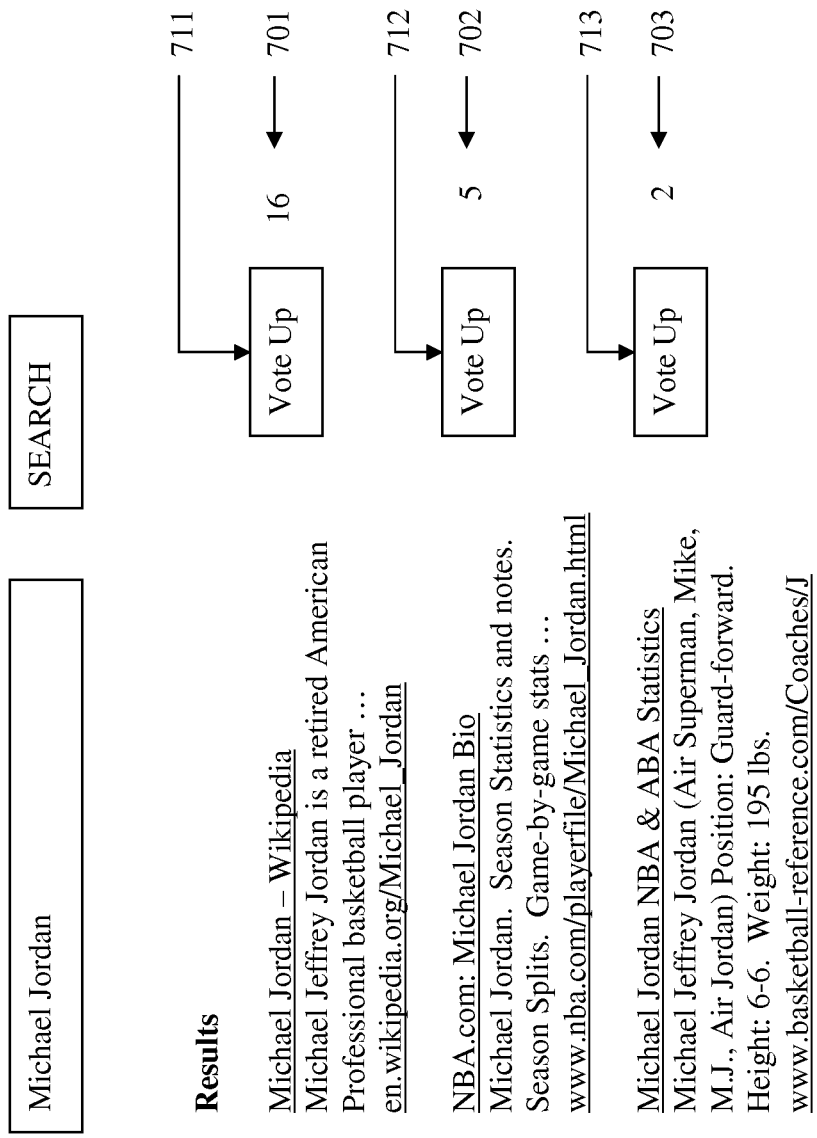
FIG. 7 illustrates an exemplary search engine results page displaying a count of the indications of response received for various result items.

FIG. 7 shows an illustrative search engine results page 700 with three search result items. Each search result item includes a vote up button (711, 712, and 713) and an indication of the number of times the result item has been voted up (701, 702, and 703). When a user clicks the vote up button, the result item may be voted up. The number of votes an item receives may influence the placement of the result item in search results. For example, a result item with more votes may be ranked higher in search results. The search engine results page 700 may be displayed in response to the user submitting a search query, such as "Michael Jordan."

Voting up an item can be an indication of response in some embodiments. Thus, some of these indications of response may have been submitted via methods described in this patent. For example, a user may receive a text message asking him to vote up the Wikipedia page for Michael Jordan, and in response to the user clicking a button next to the text message, the result item is voted up on a search engine.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed:

1. A method for displaying dynamic content from a networked post in a text message, the method performed by a computer system, the method comprising:

receiving a text message, the text message displaying dynamic content from a networked post, wherein the networked post is accessible on a network at a network location;

wherein the networked post includes a photo or video, and the photo or video is displayed in the text message;

displaying the text message to a user;

initiating a call to a first server-side script to retrieve the number of likes that the networked post has received, a client-side handler function being associated with the first server-side script;

after completion of the first server-side script, executing the client-side handler function to process a return value of the first server-side script and cause the display of the number of likes that the networked post has received;

displaying a like button for liking the networked post;

in response to activation of the like button, transmitting an indication of the user liking the networked post to a server to cause a representation of the user's act of liking the networked post to be displayed with the networked post;

wherein the act of transmitting the indication of the user liking the networked post to the server comprises initiating a call to a second server-side script to cause the indication of the user liking the networked post to be stored in a database accessible to the server;

displaying one or more comments from one or more other users about the networked post in a comment section associated with the text message;

displaying a comment field for accepting a comment from the user;

in response to the user submitting a comment via the comment field, initiating a call to a third server-side script to cause text of the user-submitted comment to be stored in the database accessible to the server;

in response to submission of a new comment by the user or another user, dynamically updating the display of comments associated with the text message to include the new comment.

2. The method of claim 1, wherein the text message is a TCP/IP text message.

3. The method of claim 1, wherein the computer system is a mobile phone connected to a base transceiver station (BTS) and a base controller station (BSC) and the text message is received through the BTS and BSC.

4. The method of claim 1, wherein the computer system is a mobile phone connected to a base transceiver station (BTS) and a base controller station (BSC), the text message is received through the BTS and BSC, and the act of transmitting the indication of the user liking the networked post to the server includes transmitting data through the BTS and BSC.

5. The method of claim 1, wherein the networked post is a post on a social network.

6. The method of claim 1, further comprising displaying on or near the text message an indication of a number of users who have liked the networked post.

7. The method of claim 1, wherein the text message includes a video and the video is playable from within the display of the text message.

8. The method of claim 1, further comprising displaying an indication of the sender of the text message.

9. A non-transitory computer-readable medium containing instructions for displaying dynamic content from a networked post in a text message, the instructions for execution by a computer system, the non-transitory computer-readable medium comprising:

instructions for receiving a text message, the text message containing dynamic content from a networked post, wherein the networked post is accessible on a network at a network location;

wherein the networked post includes a photo or video, and the photo or video is displayed in the text message;

instructions for displaying the text message to a user;

instructions for initiating a call to a first server-side script to retrieve the number of likes that the networked post has received;

instructions for, after completion of the first server-side script, executing a client-side handler function associated with the first server-side script to process a return value of the first server-side script and cause the display of the number of likes that the networked post has received;

instructions for displaying a like button for liking the networked post;

instructions for, in response to activation of the like button, transmitting an indication of the user liking the networked post to a server to cause a representation of the user's act of liking the networked post to be displayed with the networked post;

wherein the instructions for transmitting the indication of the user liking the networked post to the server comprise instructions for initiating a call to a second server-side script to cause the indication of the user liking the networked post to be stored in a database accessible to the server;

instructions for displaying one or more comments from one or more other users about the networked post in a comment section associated with the text message;

instructions for displaying a comment field for accepting a comment from the user;

instructions for, in response to the user submitting a comment via the comment field, initiating a call to a third server-side script to cause text of the user-submitted comment to be stored in the database accessible to the server;

instructions for, in response to submission of a new comment by the user or another user, dynamically updating the display of comments associated with the text message to include the new comment.

10. The non-transitory computer-readable medium of claim 9, wherein the text message is a TCP/IP text message.

11. The non-transitory computer-readable medium of claim 9, wherein the computer system for executing the instructions on the computer-readable medium is a mobile phone connected to a base transceiver station (BTS) and a base controller station (BSC), and the instructions for receiving the text message include instructions that receive the text message through the BTS and BSC.

12. The non-transitory computer-readable medium of claim 9, wherein the computer system for executing the instructions on the computer-readable medium is a mobile phone connected to a base transceiver station (BTS) and a base controller station (BSC), the instructions for receiving the text message include instructions that receive the text message through the BTS and BSC, and the instructions for transmitting the indication of the user liking the networked post to the server include instructions that transmit data through the BTS and BSC.

13. The non-transitory computer-readable medium of claim 9, wherein the networked post is a post on a social network.

14. The non-transitory computer-readable medium of claim 9, further comprising instructions for displaying on or near the text message an indication of a number of users who have liked the networked post.

15. The non-transitory computer-readable medium of claim 9, wherein the text message includes a video and the video is playable from within the display of the text message.

16. The non-transitory computer-readable medium of claim 9, further comprising instructions for displaying an indication of the sender of the text message.

17. The method of claim 1, further comprising:
parsing the text message to detect one or more Uniform Resource Locators (URLs);

parsing the one or more URLs to determine whether any of the one or more URLs are indicative of one or more networked posts for which one or more like buttons should be displayed.

18. The method of claim 1, further comprising:
displaying a like button for each of two or more different networked posts, wherein the two or more different networked posts are of different types and are from different web domains.

19. The non-transitory computer-readable medium of claim 9, further comprising:
instructions for parsing the text message to detect one or more Uniform Resource Locators (URLs);
instructions for parsing the one or more URLs to determine whether any of the one or more URLs are indicative of one or more networked posts for which one or more like buttons should be displayed.

20. The non-transitory computer-readable medium of claim 9, further comprising:
instructions for displaying a like button for each of two or more different networked posts, wherein the two or more different networked posts are of different types and are from different web domains.

* * * * *